(12) United States Patent
Lee

(10) Patent No.: US 12,537,062 B2
(45) Date of Patent: Jan. 27, 2026

(54) MEMORY DEVICE AND METHOD OF OPERATING THE SAME

(71) Applicant: SK hynix Inc., Icheon-si (KR)

(72) Inventor: Dong Uk Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 84 days.

(21) Appl. No.: 18/601,681

(22) Filed: Mar. 11, 2024

(65) Prior Publication Data
US 2025/0131963 A1   Apr. 24, 2025

(30) Foreign Application Priority Data
Oct. 24, 2023   (KR) .................. 10-2023-0143057

(51) Int. Cl.
| | | |
|---|---|---|
| *G11C 16/16* | (2006.01) | |
| *G11C 16/04* | (2006.01) | |
| *G11C 16/08* | (2006.01) | |
| *G11C 16/30* | (2006.01) | |

(52) U.S. Cl.
CPC .......... *G11C 16/16* (2013.01); *G11C 16/0433* (2013.01); *G11C 16/08* (2013.01); *G11C 16/30* (2013.01)

(58) Field of Classification Search
CPC ..... G11C 16/16; G11C 16/0433; G11C 16/08; G11C 16/30; G11C 16/0483; G11C 16/14; G11C 7/04; G11C 7/18; H10B 41/40
See application file for complete search history.

(56) References Cited

U.S. PATENT DOCUMENTS

2022/0059168 A1*   2/2022   Seo .................... G11C 16/0483

FOREIGN PATENT DOCUMENTS

| KR | 1020220026451 A | 3/2022 |
|---|---|---|
| KR | 1020230009992 A | 1/2023 |

OTHER PUBLICATIONS

Jong Kyung Park and Sarah Eunkyung Kim, A Review of Cell Operation Algorithm for 3D NAND Flash Memory, Appl. Sci MDPI, Oct. 22, 2022, 21, Seoul, Korea.

* cited by examiner

*Primary Examiner* — Amir Zarabian
*Assistant Examiner* — Bradley S Coon
(74) *Attorney, Agent, or Firm* — WILLIAM PARK AND ASSOCIATES LTD.

(57) ABSTRACT

A memory device, and a method of operating the memory device, includes a memory block including a cell plug extending between a first line and a second line, wherein a first select line, a first word line group, a first pass word line, a second word line group, and a second select line are arranged along the cell plug between the first line and the second line. The memory device also includes a peripheral circuit configured to apply an erase voltage to the first line or the second line, apply an assistance voltage to the first pass word line when the erase voltage is applied, and decrease a potential of the first pass word line while the erase voltage is maintained at a target level.

22 Claims, 24 Drawing Sheets

MEMORY DEVICE AND METHOD OF OPERATING THE SAME

CROSS-REFERENCE TO RELATED APPLICATION

The present application claims priority under 35 U.S.C. § 119(a) to Korean patent application number 10-2023-0143057, filed on Oct. 24, 2023, in the Korean Intellectual Property Office, which is incorporated herein by reference in its entirety.

BACKGROUND

1. Technical Field

Various embodiments of the present disclosure relate to a memory device and a method of operating the memory device, and more particularly, to a memory device capable of performing an erase operation and a method of operating the memory device.

2. Related Art

A memory device may include a memory cell array in which data is stored and a peripheral circuit which performs a program operation, a read operation, or an erase operation on the memory cell array.

The memory cell array may include a plurality of memory blocks disposed between bit lines and a source line, and each of the memory blocks may include cell plugs extending from a substrate in a vertical direction. Each of the cell plugs may include source select transistors, memory cells, and drain select transistors.

An erase operation of the memory device may be performed using a method of directly applying an erase voltage to cell plugs through the source line or the bit lines, or a method using gate induced drain leakage (GIDL). Of the methods, the erase operation using GIDL may be stably performed because interference from voltages applied to peripheral elements is decreased, but the time required for the erase operation may be lengthened.

SUMMARY

In accordance with an embodiment of the present disclosure is a first memory device. The first memory device may include a memory block including a cell plug extending between a source line and a bit line, wherein a source select line, a first word line group, a first pass word line, a second word line group, and a drain select line are arranged along the cell plug between the source line and the bit line. The first memory device may also include a peripheral circuit configured to apply an erase voltage to the source line or the bit line, apply an assistance voltage to the first pass word line when the erase voltage is applied, and decrease a potential of the first pass word line while the erase voltage is maintained at a target level.

In accordance with an embodiment of the present disclosure is a second memory device. The second memory device may include first, second, and third sub-blocks disposed between a source line and a bit line, a first connection region disposed between the first and second sub-blocks, a second connection region disposed between the second and third sub-blocks, a first pass word line adjacent to the first connection region, and a second pass word line adjacent to the second connection region. The second memory device may also include a peripheral circuit configured to apply an assistance voltage to the first pass word line or the second pass word line while an erase voltage is applied to the source line or the bit line, and configured to decrease a potential of the first pass word line or the second pass word line to which the assistance voltage is applied while the erase voltage is maintained at a target level.

In accordance with an embodiment of the present disclosure is a method of operating a memory device. The method may include, during an erase operation performed on a memory block including a cell plug extending between a source line and a bit line, wherein a source select line, a first word line group, a first pass word line, a second word line group, and a drain select line are arranged along the cell plug between the source line and the bit line, applying an erase voltage to the source line or the bit line, applying an assistance voltage to the first pass word line while the erase voltage is applied to the source line or the bit line, and decreasing a potential of the first pass word line while the erase voltage is maintained at a target level.

DETAILED DESCRIPTION

Specific structural or functional descriptions, disclosed herein, are exemplified to describe embodiments according to the concept of the present disclosure. The embodiments according to the concept of the present disclosure should not be construed as being limited to embodiments described below and may be modified in various forms and replaced with other equivalent embodiments.

Hereinafter, it will be understood that, although the terms "first" and "second" may be used herein to describe various elements, these elements should not be limited by these terms. The terms are used to distinguish one element from other elements and not to imply a number or order of elements.

Various embodiments of the present disclosure are directed to a memory device capable of reducing the time required for an erase operation, and a method of operating the memory device.

Figure 1:
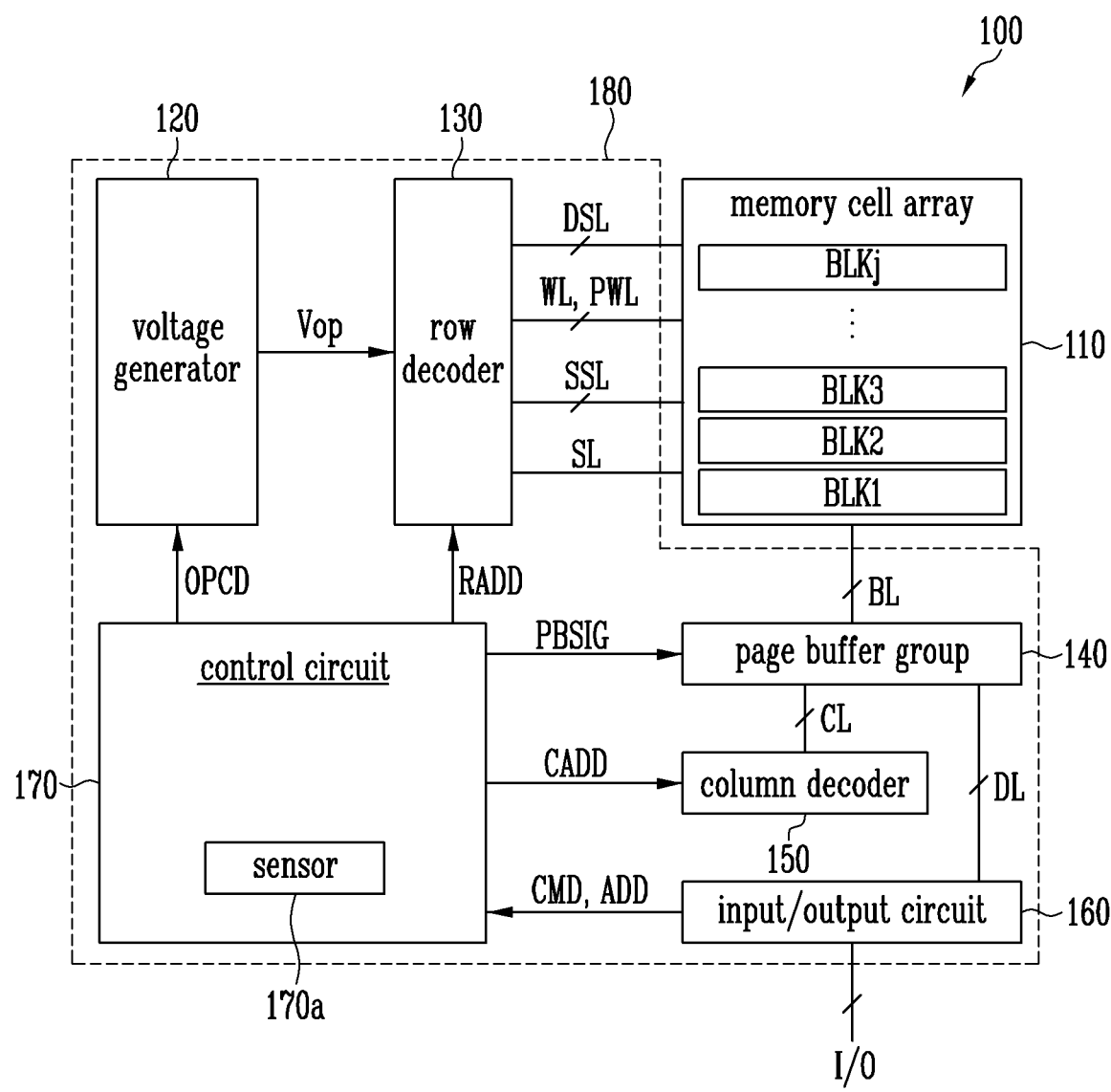
FIG. 1 is a diagram illustrating a memory device.

FIG. 1 is a diagram illustrating a memory device.

Referring to FIG. 1, a memory device 100 may include a memory cell array 110 and a peripheral circuit 180.

The memory cell array 110 may include first to j-th memory blocks BLK1 to BLKj. Each of the first to j-th memory blocks BLK1 to BLKj may include memory cells capable of storing data. Drain select lines DSL, word lines WL, source select lines SSL, and a source line SL may be coupled to each of the first to j-th memory blocks BLK1 to BLKj, and bit lines BL may be coupled in common to the first to j-th memory blocks BLK1 to BLKj.

Each of the first to j-th memory blocks BLK1 to BLKj may be formed to have a three-dimensional (3D) structure. Each memory block having a 3D structure may include memory cells stacked on a substrate in a vertical direction.

According to a program scheme, each memory cell may store 1 bit of data or 2 or more bits of data. For example, a scheme for storing 1 bit of data in one memory cell is referred to as a single-level cell (SLC) scheme, and a scheme for storing 2 bits of data in one memory cell is referred to as a multi-level cell (MLC) scheme. A scheme for storing 3 bits of data in one memory cell is referred to as a triple-level cell (TLC) scheme, and a scheme for storing 4 bits of data in one memory cell is referred to as a quad-level cell (QLC) scheme. In addition, 5 or more bits of data may be stored in one memory cell.

The peripheral circuit 180 may perform a program operation of storing data in the memory cell array 110, a read operation of outputting data stored in the memory cell array 110, and an erase operation of erasing data stored in the memory cell array 110. For example, the peripheral circuit 180 may include a voltage generator 120, a row decoder 130, a page buffer group 140, a column decoder 150, an input/output circuit 160, and a control circuit 170.

The voltage generator 120 may generate various operating voltages Vop that are used for a program operation, a read operation, or an erase operation in response to an operation code OPCD. For example, the voltage generator 120 may generate program voltages, turn-on voltages, turn-off voltages, negative voltages, precharge voltages, verify voltages, read voltages, pass voltages, erase voltages, assistance voltages, or compensation voltages in response to the operation code OPCD. Further, the voltage generator 120 may allow a node through which the generated voltages are output to float. The operating voltages Vop generated by the voltage generator 120 may be applied to the drain select lines DSL, the word lines WL, the source select lines SSL, and the source line SL of a memory block selected through the row decoder 130.

The program voltages may be voltages that are applied to the selected word line among the word lines WL during a program operation, and may be used to increase the threshold voltages of memory cells coupled to the selected word line. The turn-on voltages may be applied to the drain select lines DSL or the source select lines SSL, and may be used to turn on drain select transistors or source select transistors. The turn-off voltages may be applied to the drain select lines DSL or the source select lines SSL, and may be used to turn off the drain select transistors or the source select transistors. For example, the turn-off voltages may be set to 0 V. The precharge voltages may be voltages higher than 0 V, and may be applied to the bit lines during a read operation. The verify voltages may be used during a verify operation of determining whether the threshold voltages of selected memory cells have increased to a target level. The verify voltages may be set to various levels according to the target level, and may be applied to the selected word line.

The read voltages may be applied to the selected word line during a read operation performed on the selected memory cells. For example, the read voltages may be set to various levels according to the program scheme for the selected memory cells. The pass voltages may be voltages that are applied to unselected word lines among the word lines WL during a program or read operation, and may be used to turn on memory cells coupled to the unselected word lines.

The erase voltages may be used during an erase operation of erasing the memory cells included in the selected memory block, and may be applied to the source line SL.

The assistance voltages may be positive voltages applied to a pass word line or pass word lines coupled to the corresponding memory block during an erase operation. The assistance voltages may be output simultaneously with the erase voltages. The pumping speed of the assistance voltages may be identical to that of the erase voltages, but may vary depending on the temperature of the memory device. The pumping speed denotes the amount of change by which the potential of the node to which 0 V or an initial voltage is applied increases for a specific period of time. The voltage generator 120 may change a slope by which the assistance voltages are increased in response to the operation code OPCD.

The compensation voltages may be positive voltages applied to word lines during an erase operation. For example, the compensation voltages may be voltages applied to word lines before the word lines are discharged, and may be positive voltages higher than the voltages applied to the word lines while the erase operation is performed.

The row decoder 130 may transmit the operating voltages Vop to the drain select lines DSL, the word lines WL, the source select lines SSL, and the source line SL, which are coupled to a memory block selected according to a row address RADD. For example, the row decoder 130 may be coupled to the voltage generator 120 through global lines GL, and may be coupled to the first to j-th memory blocks BLK1 to BLKj through the drain select lines DSL, the word lines WL, the source select lines SSL, and the source line SL.

The page buffer group 140 may include page buffers (not illustrated) coupled to the first to j-th memory blocks BLK1 to BLKj, respectively. The page buffers (not illustrated) may be coupled to the first to j-th memory blocks BLK1 to BLKj, respectively, through the bit lines BL. During a read operation, the page buffers (not illustrated) may sense the currents or voltages of the bit lines varying with the threshold voltages of the selected memory cells in response to page buffer control signals PBSIG, and may temporarily store the sensed data.

The column decoder 150 may be configured such that data is transferred between the page buffer group 140 and the input/output circuit 160 in response to a column address CADD. For example, the column decoder 150 may be coupled to the page buffer group 140 through column lines CL, and may transmit enable signals through the column lines CL. The page buffers (not illustrated) included in the page buffer group 140 may receive or output data through data lines DL in response to the enable signals.

The input/output circuit 160 may receive or output a command CMD, an address ADD, or data through input/output lines I/O. For example, the input/output circuit 160 may transmit the command CMD and the address ADD, received from an external controller through the input/output lines I/O, to the control circuit 170, and may transmit the data, received from the external controller through the input/output lines I/O, to the page buffer group 140. Alternatively, the input/output circuit 160 may output data, received from the page buffer group 140, to the external controller through the input/output lines I/O.

The control circuit 170 may output the operation code OPCD, the row address RADD, the page buffer control signals PBSIG, and the column address CADD in response to the command CMD and the address ADD. For example, when the command CMD input to the control circuit 170 is a command corresponding to a program operation, the control circuit 170 may control the devices included in the peripheral circuit 180 so that the program operation is performed on a memory block selected by the address ADD. When the command CMD input to the control circuit 170 is a command corresponding to a read operation, the control circuit 170 may control the devices included in the peripheral circuit 180 so that the read operation is performed on a memory block selected by the address and read data is output. When the command CMD input to the control circuit 170 is a command corresponding to an erase operation, the control circuit 170 may control the devices included in the peripheral circuit 180 so that the erase operation is performed on a selected memory block. The control circuit 170 may include a sensor 170a configured to sense the temperature of the memory device 100. The sensor 170a may sense the temperature of the memory cell array 110 or the peripheral circuit 180, and may store the sensed value.

Figure 2A:
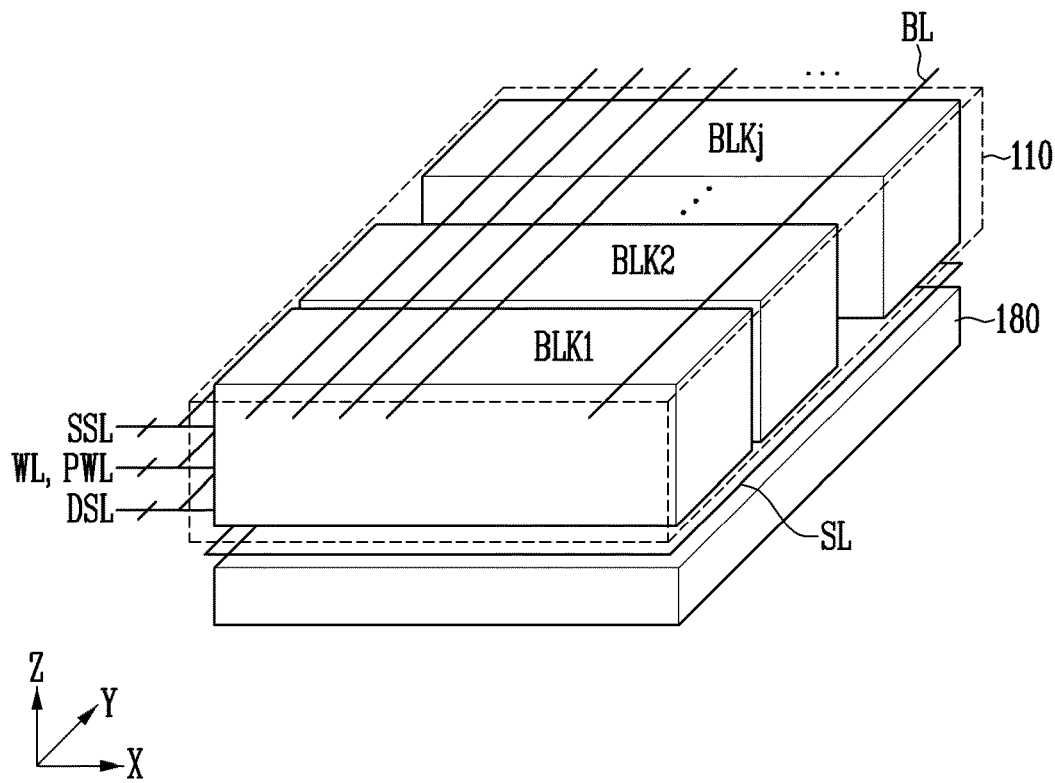
FIGS. 2A and 2B are diagrams illustrating a memory cell array.
Figure 2B:
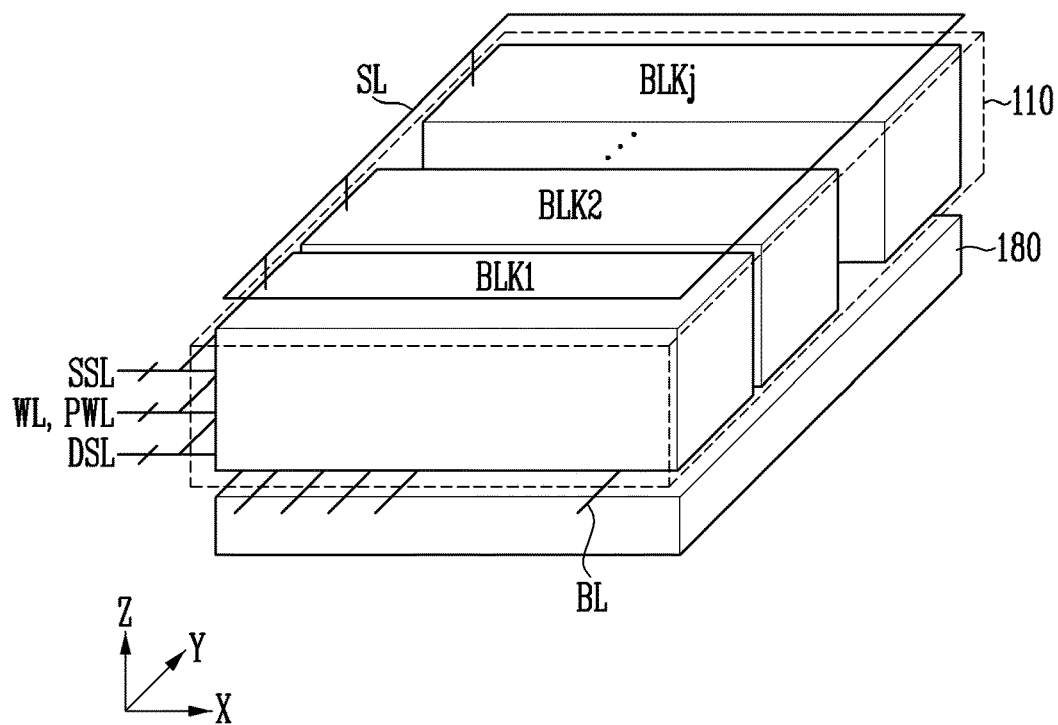

FIGS. 2A and 2B are diagrams illustrating a memory cell array.

Referring to FIG. 2A, the memory cell array 110 may be disposed on the peripheral circuit 180. The memory cell array 110 may include first to j-th memory blocks BLK1 to BLKj. For example, assuming that the peripheral circuit 180 is formed horizontally on a substrate having an XY plane, the memory cell array 110 may be disposed on the peripheral circuit 180 along a Z direction vertical to the XY plane. The first to j-th memory blocks BLK1 to BLKj may be arranged to be spaced apart from each other along a Y direction.

The first to j-th memory blocks BLK1 to BLKj may be disposed between bit lines BL and a source line SL. When the bit lines BL is disposed on the first to j-th memory blocks BLK1 to BLKj, the source line SL may be disposed under the first to j-th memory blocks BLK1 to BLKj. For example, the source line SL may be disposed between the peripheral circuit 180 and the first to j-th memory blocks BLK1 to BLKj. Drain select lines DSL, source select lines SSL, word lines WL, and pass word lines PWL may be coupled to the first to j-th memory blocks BLK1 to BLKj. The drain select lines DSL may be disposed in a region close to the source line SL, the source select lines SSL may be disposed in a region close to the bit lines BL, and the word lines WL and the pass word lines PWL may be disposed between the drain select lines DSL and the source select lines SSL. The pass word lines PWL may be disposed between the word lines WL.

Referring to FIG. 2B, the memory cell array 110 may be disposed on the peripheral circuit 180. The memory cell array 110 may include first to j-th memory blocks BLK1 to BLKj. For example, assuming that the peripheral circuit 180 is formed horizontally on a substrate having an XY plane, the memory cell array 110 may be disposed on the peripheral circuit 180 along a Z direction vertical to the XY plane. The first to j-th memory blocks BLK1 to BLKj may be arranged to be spaced apart from each other along a Y direction.

The first to j-th memory blocks BLK1 to BLKj may be disposed between bit lines BL and a source line SL. When the source line SL is disposed on the first to j-th memory blocks BLK1 to BLKj, the bit lines BL may be disposed under the first to j-th memory blocks BLK1 to BLKj. For example, the bit lines BL may be disposed between the peripheral circuit 180 and the first to j-th memory blocks BLK1 to BLKj. Drain select lines DSL, source select lines SSL, word lines WL, and pass word lines PWL may be coupled to the first to j-th memory blocks BLK1 to BLKj. The drain select lines DSL may be disposed in a region close to the bit lines BL, the source select lines SSL may be disposed in a region close to the source line SL, and the word lines WL and the pass word lines PWL may be disposed between the drain select lines DSL and the source select lines SSL. The pass word lines PWL may be disposed between the word lines WL.

Figure 3:
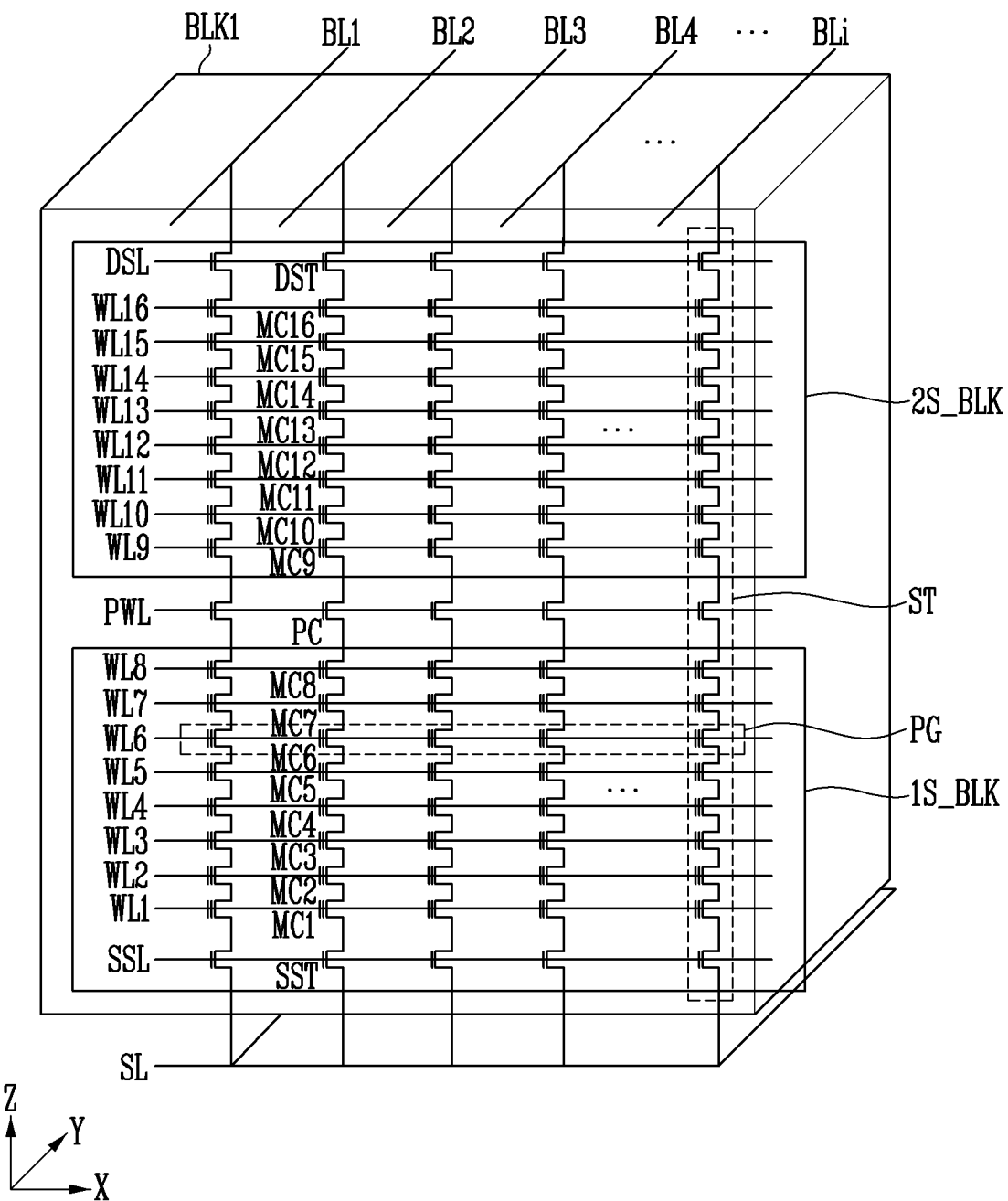
FIG. 3 is a diagram illustrating a memory block.

FIG. 3 is a diagram illustrating a memory block.

Referring to FIG. 3, the first memory block BLK1 illustrated in FIG. 2A is illustrated by way of example. The second to j-th memory blocks BLK2 to BLKj, which are the remaining memory blocks, may be configured similarly to the first memory block BLK1.

The first memory block BLK1 may include a first sub-block 1S_BLK and a second sub-block 2S_BLK disposed between the source line SL and the first to i-th bit lines BL1 to BLi, and may include pass cells PC disposed between the first and second sub-blocks 1S_BLK and 2S_BLK. Of the first and second sub-blocks 1S_BLK and 2S_BLK, the first sub-block 1S_BLK may be located closer to the source line SL, and the second sub-block 2S_BLK may be located closer to the first to i-th bit lines BL1 to BLi.

The first sub-block 1S_BLK may include source select transistors SST and first to eighth memory cells MC1 to MC8. The second sub-block 2S_BLK may include ninth to sixteenth memory cells MC9 to MC16 and drain select transistors DST. The pass cells PC may be coupled between the eighth memory cells MC8 of the first sub-block 1S_BLK and the ninth memory cells MC9 of the second sub-block 2S_BLK. The source select transistor SST, the first to sixteenth memory cells MC1 to MC16, the pass cell PC, and the drain select transistor DST coupled between one bit line and the source line may form a cell string ST. For example, the cell strings ST may be coupled to the first to i-th bit lines BL1 to BLi, respectively. Because FIG. 3 is a diagram illustrating an embodiment of the first memory block BLK1, the numbers of the source select transistors SST, the first to sixteenth memory cells MC1 to MC16, and the drain select transistors DST, which are included in the cell string ST, may vary depending on the memory device. Gates of the source select transistors SST included in different cell strings ST may be coupled to a source select line SSL, gates of the first to sixteenth memory cells MC1 to MC16 may be coupled to first to sixteenth word lines WL1 to WL16, gates of the pass cells PC may be coupled to a pass word line PWL, and gates of the drain select transistors DST may be coupled to a drain select line DSL. A group of memory cells coupled to the same word line may be a page (PG). A program or read operation may be performed on a page (PG) basis. Because the numbers of the source select transistors SST, the first to sixteenth memory cells MC1 to MC16, the pass cells PC, and the drain select transistors DST, which are included in the cell string ST, may vary depending on the memory device, the numbers of the source select lines SSL, the first to sixteenth word lines WL1 to WL16, the pass word lines PWL, and the drain select lines DSL may also vary depending on the memory device.

FIGS. 4A to 4G are views illustrating various structures of a memory block.

Figure 4A:
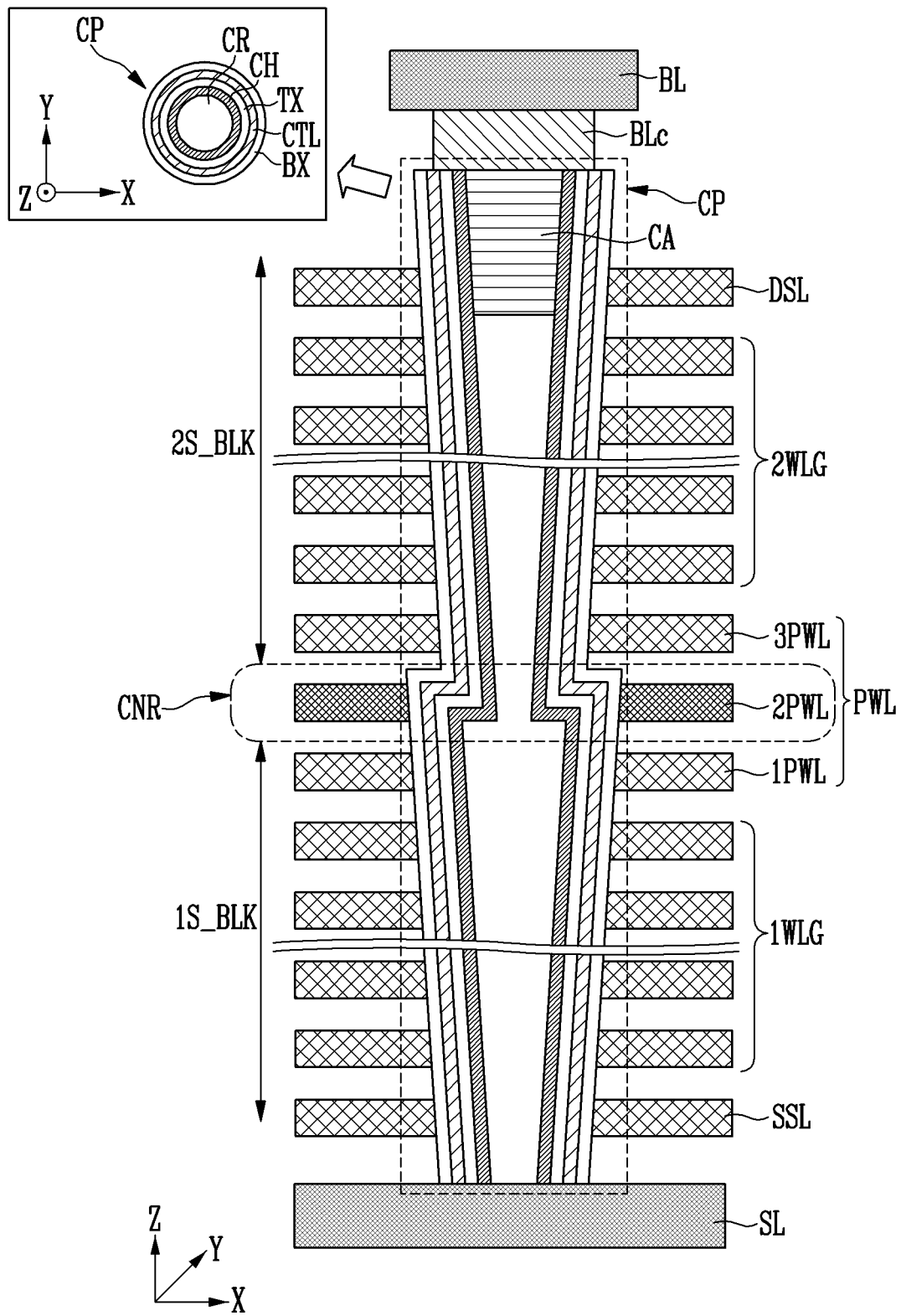
FIGS. 4A to 4G are views illustrating various structures of a memory block.

Referring to FIG. 4A, the memory block may include a source select line SSL, a first word line group 1WLG, a pass word line PWL, a second word line group 2WLG, a drain select line DSL, a cell plug CP, a bit line contact BLc, and a bit line BL, which are stacked on a source line SL and spaced apart from each other.

Each of the source line SL, the bit line contact BLc, and the bit line BL may be formed of a conductive material such as polysilicon, tungsten, or nickel. Each of the source select line SSL, the first word line group 1WLG, the pass word line PWL, the second word line group 2WLG, and the drain select line DSL may be formed of a conductive material such as tungsten (W), molybdenum (Mo), cobalt (Co), or nickel (Ni), or a semiconductor material such as silicon (Si) or polysilicon (Poly-Si). Because the conductive material or the semiconductor material is an example for explaining the memory block according to the present disclosure, various materials having conductivity may be used in addition to the above-described materials.

The cell plug CP may contact the source line SL after penetrating the source select line SSL, the first word line group 1WLG, the pass word line PWL, the second word line group 2WLG, and the drain select line DSL. The cell plug CP may include a core pillar CR, a channel layer CH, a tunnel isolation layer TX, a charge trap layer CTL, and a blocking layer BX. Each of the core pillar CR, the channel layer CH, the tunnel isolation layer TX, the charge trap layer CTL, and the blocking layer BX may be used as a source select transistor, a memory cell, or a drain select transistor depending on the position thereof. The core pillar CR may have a pillar shape, and may be formed of an insulating material or a conductive material. The channel layer CH may enclose the side surface of the core pillar CR, and may be formed of polysilicon. The tunnel isolation layer TX may enclose the side surface of the channel layer CH, and may be formed of an oxide layer. The charge trap layer CTL may enclose the side surface of the tunnel isolation layer TX, and may be formed of a nitride layer. The blocking layer BX may enclose the side surface of the charge trap layer CTL, and may be formed of an oxide layer. A capping layer CA for improving a current flow may be further formed in a drain select transistor DST on the core pillar CR. When the capping layer CA is disposed on the core pillar CR, the position of the upper surface of the core pillar CR may be lower than that of the upper surface of the channel layer CH. Therefore, the side surface of the capping layer CA may be enclosed by the channel layer CH. The capping layer CAP may be formed of a conductive material.

The bit line contact BLc may be disposed on the cell plug CP, and the bit line BL may be disposed on the bit line contact BLc. Each of the bit line contact BLc and the bit line BL may be formed of a conductive material. Therefore, the bit line BL, the bit line contact BLc, and the cell plug CP may be electrically connected to each other.

Due to the characteristics of a manufacturing process for the memory block, the width of the cell plug CP may narrow from the top to the bottom. This phenomenon may occur in an etching process, and may further increase as an aspect ratio increases. When the cell plug CP is formed in a stacked manner, a bending may be formed in a connection region CNR in which cell plugs contact each other. For example, to increase the number of memory cells, a lower cell plug is formed, after which an upper cell plug may be formed on the lower cell plug. The upper width of the lower cell plug may be greater than the lower width of the upper cell plug, and the upper width of the upper cell plug may also be greater than the lower width of the upper cell plug. Therefore, the lower width of the upper cell plug may be smaller than the upper width of the lower cell plug, whereby a width difference in the cell plug CP is largest in the connection region CNR in which the lower cell plug and the upper cell plug contact each other. For example, the cell plug abruptly changes its width where the lower cell plug and the upper cell plug contact each other.

Because the layers BX, CTL, TX, CH, CR, and CA forming the memory cells extend in the Z direction of the cell plug CP, a difference between the electrical characteristics of the memory cells may occur in the connection region CNR in which a larger size difference occurs. In this way, because the memory cells disposed in the connection region CNR in which the difference between electrical characteristics occurs may have low reliability, the cells disposed in the connection region CNR may be used as pass cells. The pass cells do not store data, and may be used as switching transistors which electrically connect or disconnect the lower portion and upper portion of the cell plug to or from each other. A gate line coupled to the pass cells may be the pass word line PWL.

The memory block may be divided into the first sub-block 1S_BLK and the second sub-block 2S_BLK with respect to the pass word line PWL. The first sub-block 1S_BLK may be disposed between the pass word line PWL and the source line SL, and the second sub-block 2S_BLK may be disposed between the pass word line PWL and the bit line BL. Among the word lines, the word lines of the first sub-block 1S_BLK may be included in the first word line group 1WLG, and the word lines of the second sub-block 2S_BLK may be included in the second word line group 2WLG. Therefore, the first sub-block 1S_BLK may include the source select line SSL and the first word line group 1WLG, and the second sub-block 2S_BLK may include the drain select line DSL and the second word line group 2WLG.

The connection region CNR may be designated as various regions depending on the memory device, and the number and position of pass word lines disposed in the connection region CNR may also be variously changed depending on the memory device.

FIGS. 4B to 4G illustrate embodiments of various memory blocks, each including a pass word line PWL. Because components in FIGS. 4B to 4G, except for the pass word line PWL, are similar to those illustrated in FIG. 4A, repeated descriptions thereof will be omitted.

Figure 4B:
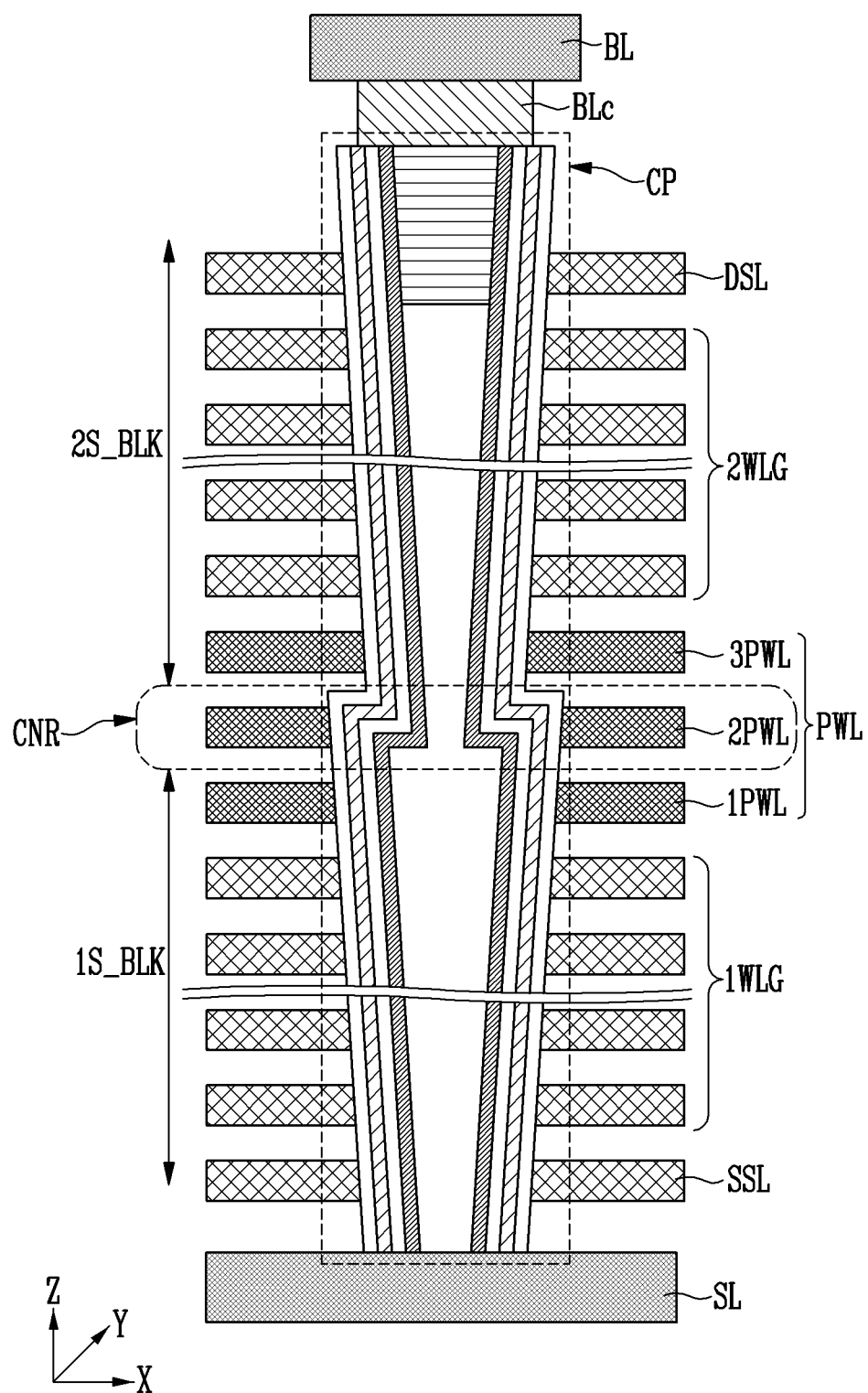

Referring to FIG. 4B, gate lines in the connection region CNR and gate lines adjacent to the connection region CNR may be designated as pass word lines. For example, a gate line adjacent to the connection region CNR, among word lines included in the first sub-block 1S_BLK, may be designated as a first pass word line 1PWL. A gate line disposed in the connection region CNR may be designated as a second pass word line 2PWL, and a gate line adjacent to the connection region CNR, among word lines included in the second sub-block 2S_BLK, may be designated as a third pass word line 3PWL. The same voltage or different voltages may be simultaneously applied to the first to third pass word lines 1PWL to 3PWL. Alternatively, the same voltage or different voltages may be applied to the first to third pass word lines 1PWL to 3PWL at different times.

Figure 4C:
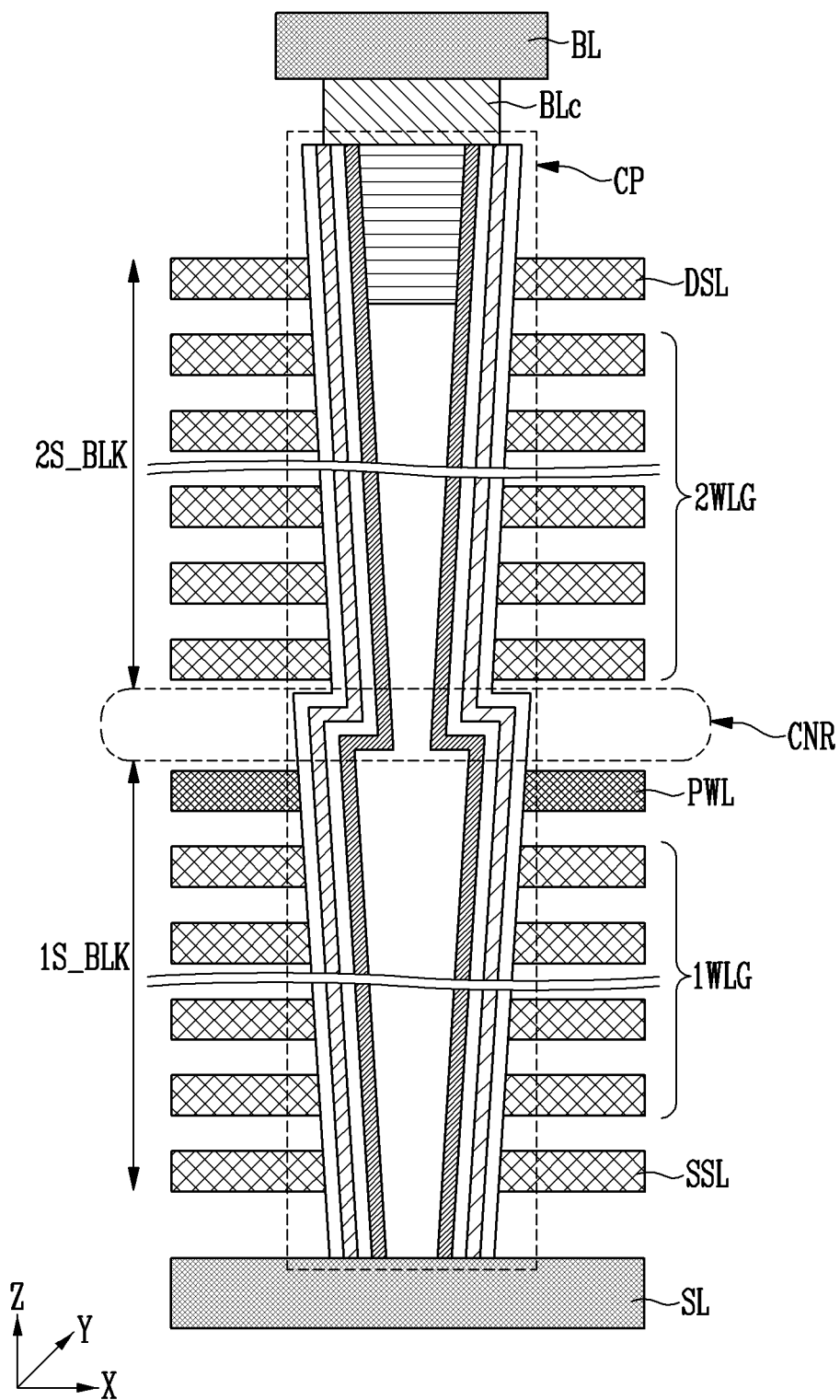

Referring to FIG. 4C, a gate line might not be formed in the connection region CNR, and a gate line located in an uppermost portion, among the gate lines included in the first sub-block 1S_BLK, may be designated as the pass word line PWL.

Figure 4D:
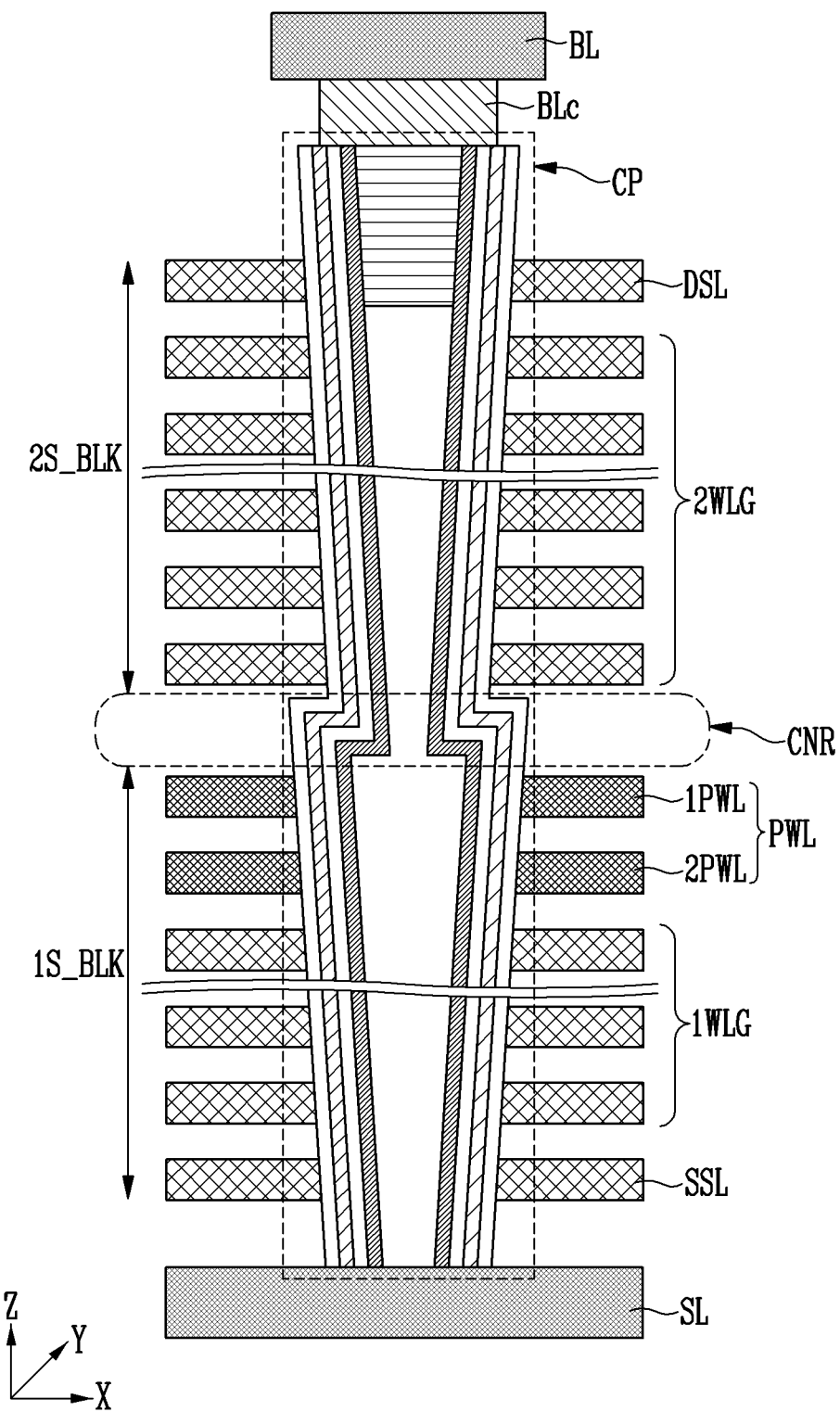

Referring to FIG. 4D, a gate line might not be formed in the connection region CNR, and two gate lines adjacent to the connection region CNR, among the gate lines included in the first sub-block 1S_BLK, may be designated as first and second pass word lines 1PWL and 2PWL. For example, the second pass word line 2PWL may be a gate line adjacent to the first word line group 1WLG, and the first pass word line 1PWL may be disposed on the second pass word line 2PWL. Alternatively, among the gate lines included in the first sub-block 1S_BLK, at least three gate lines adjacent to the connection region CNR may also be designated as the pass word lines.

Figure 4E:
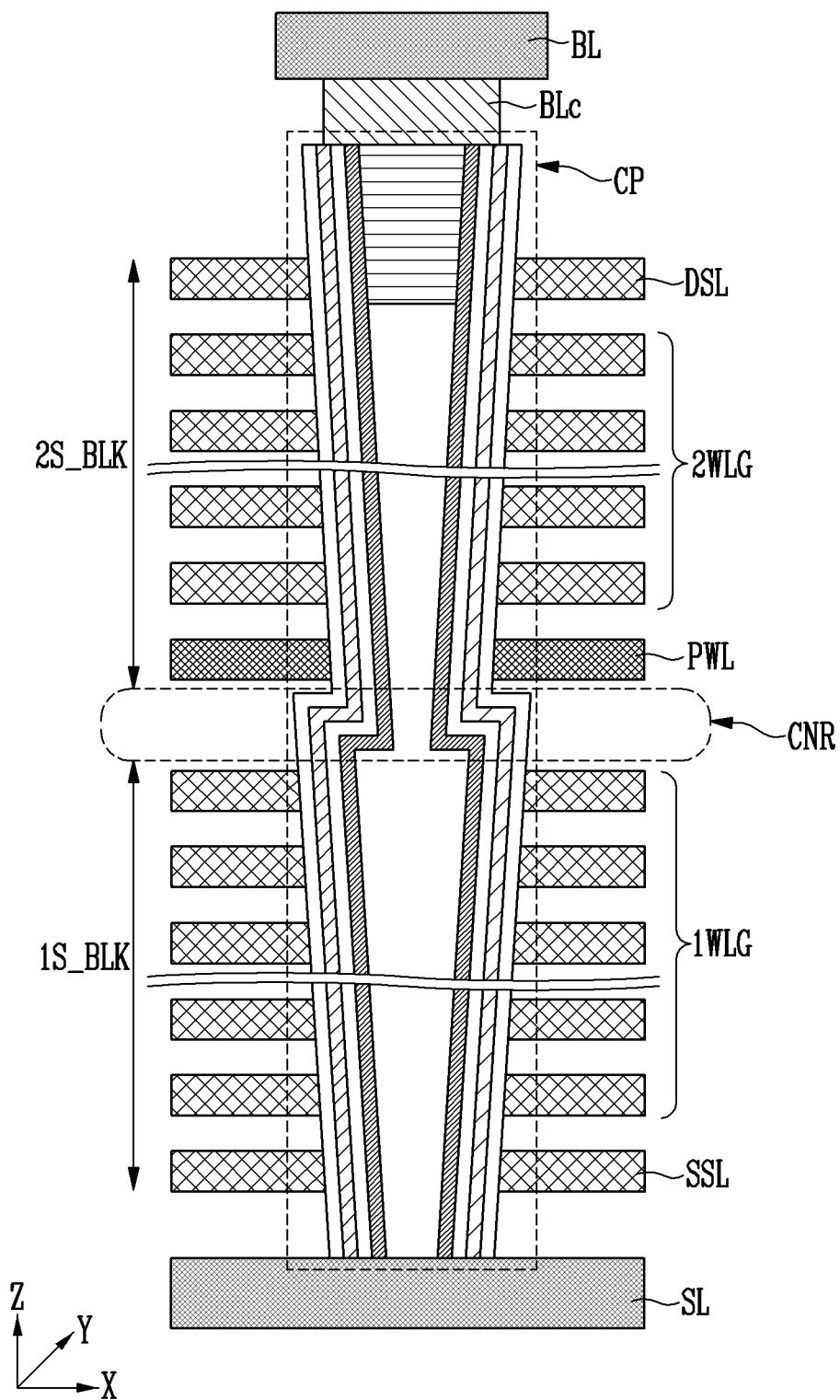

Referring to FIG. 4E, a gate line might not be formed in the connection region CNR, and a gate line located in a lowermost portion, among the gate lines included in the second sub-block 2S_BLK, may be designated as the pass word line PWL.

Figure 4F:
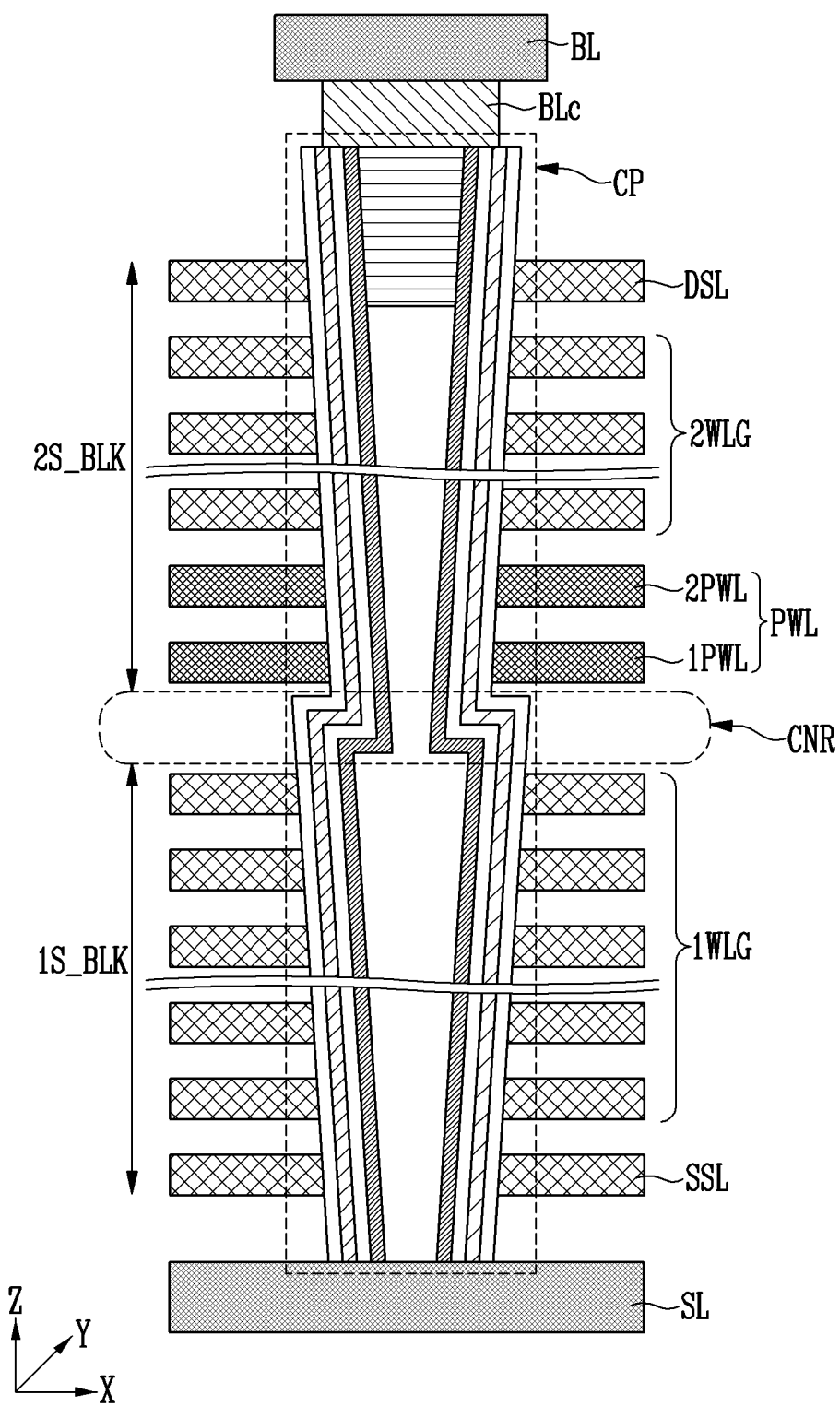

Referring to FIG. 4F, a gate line might not be formed in the connection region CNR, and two gate lines adjacent to the connection region CNR, among the gate lines included in the second sub-block 2S_BLK, may be designated as first and second pass word lines 1PWL and 2PWL. For example, the first pass word line 1PWL may be a gate line located in a lowermost portion, among the gate lines included in the second sub-block 2S_BLK, and the second pass word line 2PWL may be disposed on the first pass word line 1PWL. Alternatively, among the gate lines included in the second sub-block 2S_BLK, at least three gate lines adjacent to the connection region CNR may also be designated as the pass word lines.

Figure 4G:
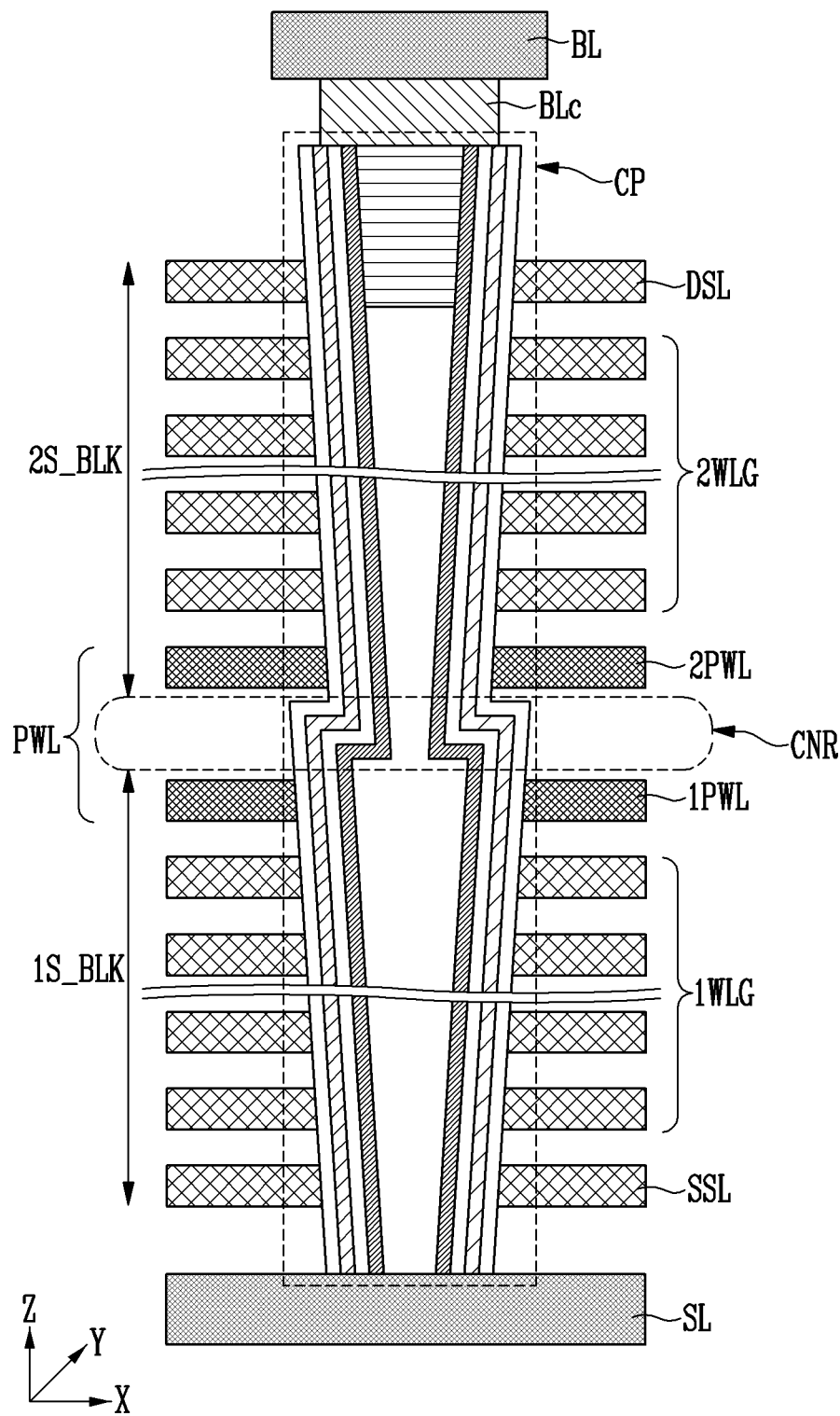

Referring to FIG. 4G, a gate line might not be formed in the connection region CNR, and some gate lines adjacent to the connection region CNR, among the gate lines included in the first and second sub-blocks 1S_BLK and 2S_BLK, respectively, may be designated as pass word lines. For example, a gate line located in an uppermost portion, among the gate lines included in the first sub-block 1S_BLK, may be designated as the first pass word line 1PWL, and a gate line located in a lowermost portion, among the gate lines included in the second sub-block 2S_BLK, may be designated as the second pass word line 2PWL.

Figure 5:
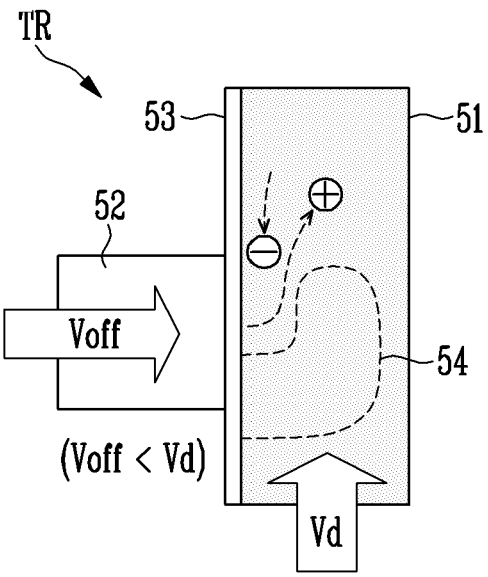
FIG. 5 is a diagram illustrating GIDL.

FIG. 5 is a diagram illustrating gate induced drain leakage (GIDL).

Referring to FIG. 5, gate induced drain leakage (GIDL) may be leakage occurring due to the difference between a drain voltage and a gate voltage. When a transistor TR composed of a substrate 51, a gate 52, and an insulating layer 53 is described as an example, a drain voltage Vd may be applied to a drain 54 of the substrate 51, and a turn-off voltage Voff lower than the drain voltage Vd may be applied to the gate 52. For example, the drain voltage Vd may be a positive voltage higher than 0 V, and the turn-off voltage Voff may be a voltage lower than the drain voltage Vd. For example, the turn-off voltage Voff may be 0 V.

When a voltage difference between the drain voltage Vd and the turn-off voltage Voff increases beyond a specific value, an energy band of the drain 54 may be changed. Due thereto, electrons (−) may move from the substrate 51 toward the gate 52, and electron holes (+) may move from a region adjacent to the gate 52 toward the substrate 51. That is, with respect to the transistor TR, the electron holes (+) may move in a direction opposite the region to which the drain voltage Vd is applied. When GIDL occurs, the voltage of the substrate 51 may increase more slowly than when the transistor TR is turned on. The reason for this is that the speed at which electron holes (+) generated by GIDL move is lower than the speed at which a voltage is transferred in the substrate 51.

The electron holes (+) generated by GIDL have a low movement speed, but may be generated at a uniform amount, and may move at a constant speed, thus helping the memory device improve the reliability of the erase operation thereof.

Figure 6:
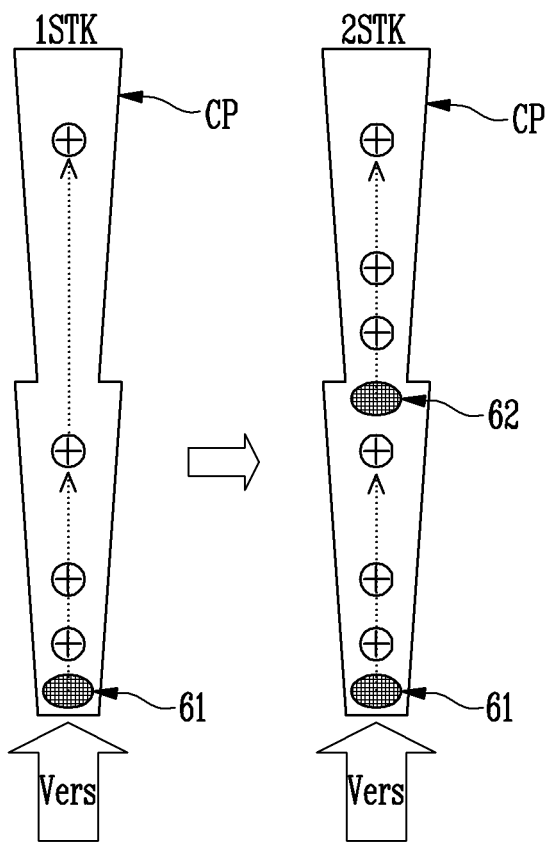
FIG. 6 is a diagram illustrating the principle of an erase operation according to an embodiment of the present disclosure.

FIG. 6 is a diagram illustrating the principle of an erase operation according to an embodiment of the present disclosure.

Referring to FIG. 6, an erase voltage Vers may be applied to a cell plug CP through a lower region or an upper region of the cell plug CP. GIDL may occur in a region 61 to which the erase voltage Vers is applied. The erase voltage Vers may be applied through a source line or a bit line, and FIG. 6 illustrates an embodiment in which the erase voltage Vers is applied through the source line. When the erase voltage Vers is applied to the source line, a positive voltage, 0 V, or a negative voltage may be applied to the bit line. Alternatively, the bit line may float. The voltage applied to the bit line may be variously changed depending on the erase method of the memory device.

Because the source line or the bit line is coupled through a lower end or an upper end of the cell plug CP, GIDL may occur in a region adjacent to the ends of the cell plug CP.

In a first structure 1STK in which GIDL occurs only at an end 61 of the cell plug CP, the time required by an electron hole (+) to move to the opposite end of the cell plug CP is assumed to be a first time. Unlike the first structure 1STK, in a second structure 2STK in which GIDL occurs both at the end 61 and a middle point 62 of the cell plug CP, a second time required by an electron hole (+) to move to the opposite end of the cell plug CP may be shorter than the first time. That is, as in the case of the second structure 2STK, when GIDL occurs at the end 61 and the middle point 62 of the cell plug CP, an electron hole (+) generated at the middle point 62 may reach a portion of the cell plug CP to which the erase voltage Vers is not applied, and thus the time required by the electron hole (+) to reach the entire cell plug CP may be shortened.

The erase operation described in the present embodiment is based on the second structure 2STK.

Figure 7:
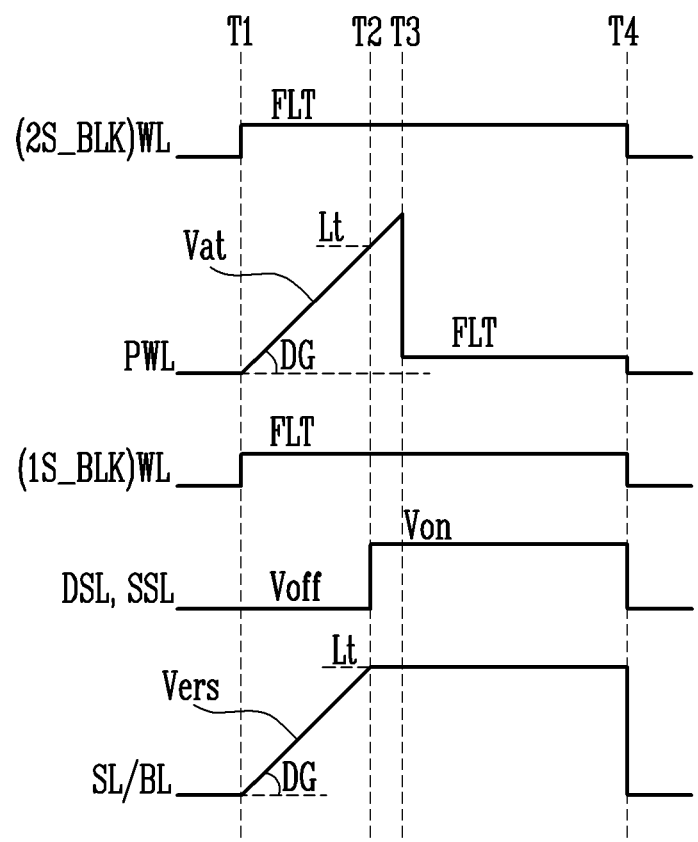
FIG. 7 is a timing diagram illustrating an erase operation according to a first embodiment of the present disclosure.

FIG. 7 is a timing diagram illustrating an erase operation according to a first embodiment of the present disclosure.

A source line SL, a bit line BL, a drain select line DSL, a source select line SSL, a word line WL, a pass word line PWL, a first sub-block 1S_BLK, and a second sub-block 2S_BLK, described with reference to FIG. 7, may correspond to lines or blocks illustrated in any one of FIGS. 4A to 4G. The erase operations according to embodiments of the present disclosure may be performed by a peripheral circuit (e.g., 180 of FIG. 1). The peripheral circuit may be operated under the control of a control circuit (e.g., 170 of FIG. 1).

Referring to FIG. 7, at a first time T1, an erase voltage Vers may be applied to the source line SL or the bit line BL, and an assistance voltage Vat may be applied to the pass word line PWL. The erase voltage Vers may be a positive voltage higher than 0 V, and the assistance voltage Vat may be a voltage equal to the erase voltage Vers. At the first time T1, a turn-off voltage Voff may be applied to the drain select line DSL and the source select line SSL, and the word lines WL of the first and second sub-blocks 1S_BLK and 2S_BLK may float (FLT). The turn-off voltage Voff may be 0 V. Therefore, drain and source select transistors may be turned off. When the word lines WL are floating in the state in which the drain and source select transistors are turned off, coupling or boosting may occur in the word lines WL due to the voltages applied to the neighboring lines of the word lines WL, with the result that the voltages of the word lines WL may increase. Even though the voltages of the word lines WL increase, since the voltages are increased by coupling or boosting, thus the voltages do not become high enough to influence electrons trapped into the memory cells.

During a period from the first to second times T1-T2, the levels of the erase voltage Vers applied to the source line SL or the bit line BL and the assistance voltage Vat applied to the pass word line PWL increase, whereby GIDL may occur in the drain or source select transistor that is turned off. For example, when the erase voltage Vers is applied to the source line SL, GIDL may occur in the source select transistor. When the erase voltage Vers is applied to the bit line BL instead of the source line SL, GIDL may occur in the drain select transistor.

Because the assistance voltage Vat is equal to the erase voltage Vers, a slope (DG) at which the erase voltage Vers increases may be identical to a slope (GD) at which the assistance voltage Vat increases.

When the second time T2 at which the erase voltage Vers increases up to a target level Lt is reached, a turn-on voltage Von may be applied to the drain and source select lines DSL and SSL. The turn-on voltage Von may be set to a positive voltage that enables the drain or source select transistor to be turned on.

Even though the turn-on voltage Von is applied at the second time T2, a pumping operation for the assistance voltage Vat applied to the pass word line PWL may continue to be performed. For example, although the assistance voltage Vat has also increased to the same target level Lt as the erase voltage Vers at the second time T2, the assistance voltage Vat may further increase during a period from the second to third times T2-T3 to maintain GIDL for a longer duration in a middle portion of the cell plug. That is, a main erase operation of erasing memory cells starts from the second time T2 at which the erase voltage Vers reaches the target level Lt, but a weak erase operation may also be performed on the memory cells due to electron holes even during the period from the first to second times T1-T2, which is the GIDL occurrence period. The weak erase operation refers to an operation in which memory cells are erased slower than the main erase operation.

When the third time T3 is reached, a voltage generator (e.g., 120 of FIG. 1) may decrease the voltage of the pass word line PWL, and may allow the pass word line PWL to float (FLT).

When a fourth time T4 at which the erase operation is terminated is reached, the potentials of the source line SL, the bit line BL, the drain select line DSL, the source select line SSL, the word lines WL, and the pass word line PWL may be discharged to 0 V.

Figure 8:
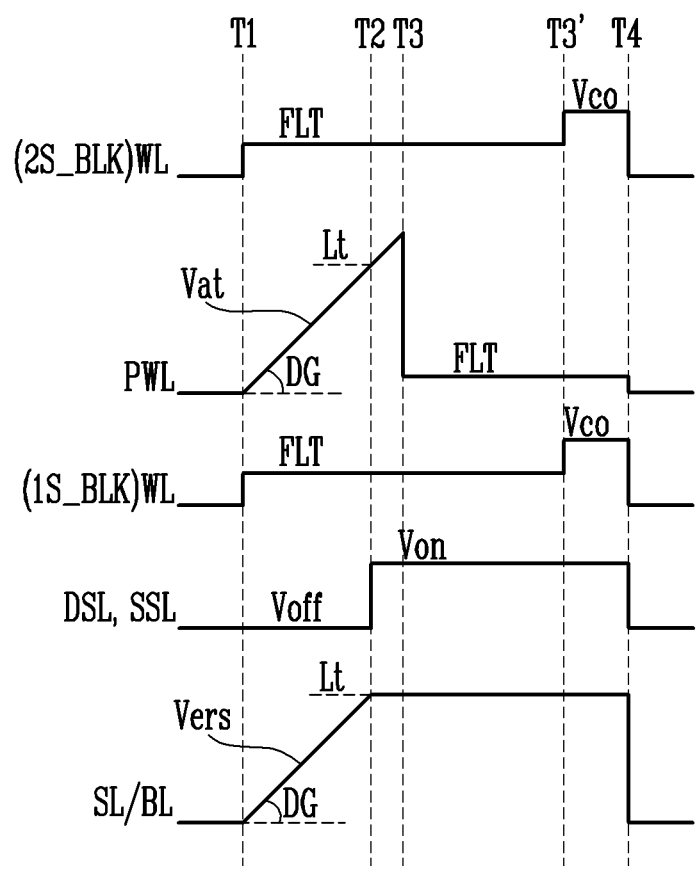
FIG. 8 is a timing diagram illustrating an erase operation according to a second embodiment of the present disclosure.

FIG. 8 is a timing diagram illustrating an erase operation according to a second embodiment of the present disclosure.

A source line SL, a bit line BL, a drain select line DSL, a source select line SSL, a word line WL, a pass word line PWL, a first sub-block 1S_BLK, and a second sub-block 2S_BLK, described with reference to FIG. 8, may correspond to lines or blocks illustrated in any one of FIGS. 4A to 4G.

Referring to FIG. 8, an operation performed during a period from first to third times T1-T3 in the erase operation according to the second embodiment may be performed in the same manner as the operation performed during the period from the first to third times T1-T3 in the erase operation according to the first embodiment, and thus repeated descriptions thereof will be omitted.

In the second embodiment, before a fourth time T4 at which word lines WL are discharged, an equalizing operation may be further performed. The equalizing operation is an operation of preventing the voltages of the word lines WL from excessively decreasing when the word lines WL are discharged. The equalizing operation may be performed at a 3'-rd time T3' between the third and fourth times T3 and T4. For example, during a period from 3'-rd to fourth times T3'-T4, a compensation voltage Vco may be applied to the word lines WL. The compensation voltage Vco may be set to a positive voltage, the level of which is lower than or equal to that of the turn-on voltage Von.

When the fourth time T4 is reached, the potentials of the source line SL, the bit line BL, the drain select line DSL, the source select line SSL, the word lines WL, and the pass word line PWL may be discharged to 0 V.

Figure 9:
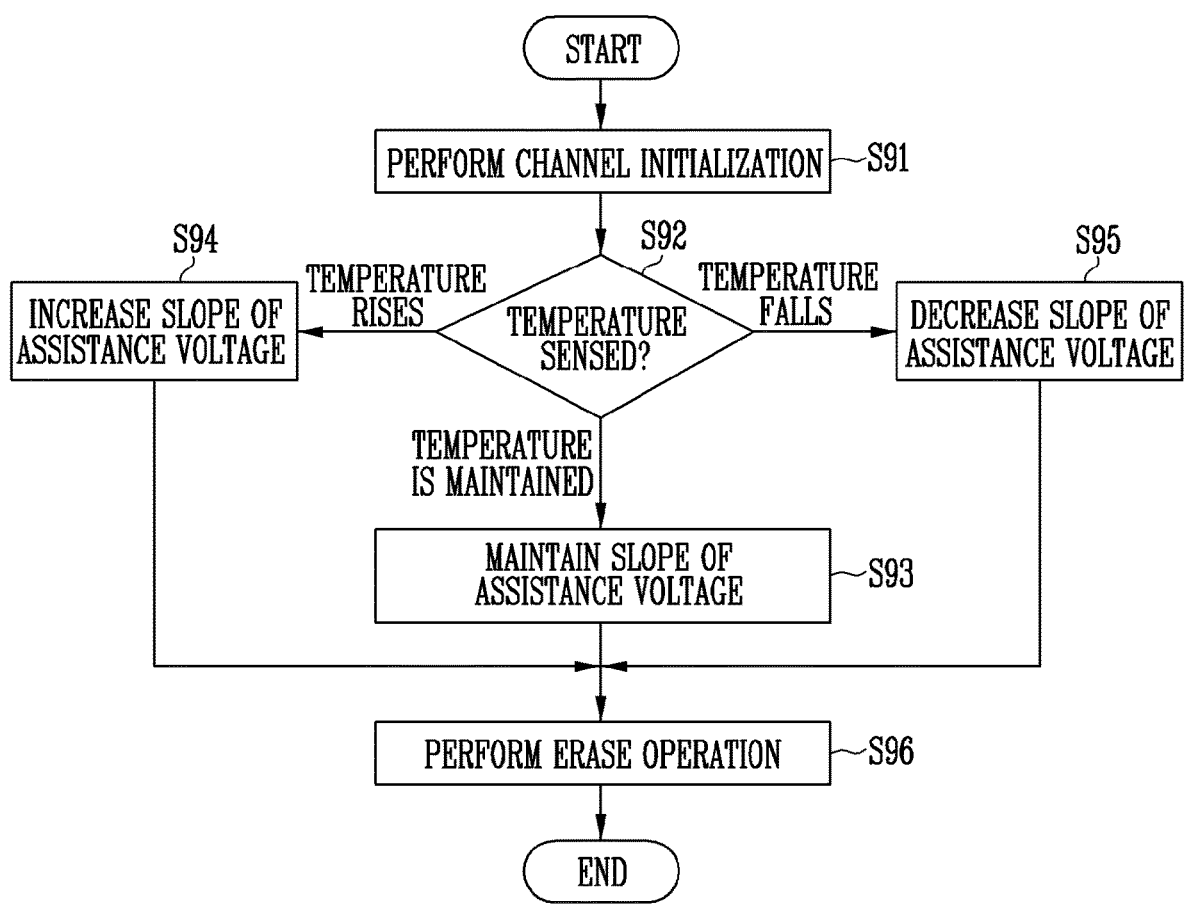
FIG. 9 is a flowchart illustrating an erase operation according to a third embodiment of the present disclosure.

FIG. 9 is a flowchart illustrating an erase operation according to a third embodiment of the present disclosure.

A source line SL, a bit line BL, a drain select line DSL, a source select line SSL, a word line WL, a pass word line PWL, a first sub-block 1S_BLK, and a second sub-block 2S_BLK, described with reference to FIG. 9, may correspond to lines or blocks illustrated in any one of FIGS. 4A to 4G.

Referring to FIG. 9, in the erase operation according to the third embodiment, the slope of an assistance voltage may be adjusted depending on the temperature of the memory device. The erase operation according to the third embodiment may be performed as follows.

When an erase command is input to the memory device, a channel initialization operation S91 may be performed on a selected memory block. The channel initialization operation S91 may be an operation of equally decreasing the voltages of channels of the selected memory block. For example, the channel initialization operation may be an operation of decreasing the potential of a channel layer (e.g., CH of FIG. 4A). For example, during the channel initialization operation S91, the channel layer CH may be discharged.

When the channel initialization operation S91 is completed, a temperature sensing operation S92 may be performed. The temperature sensing operation S92 may be performed using the temperature sensor of the memory device. The temperature sensor of the memory device may sense the temperature of a memory cell array or a peripheral circuit.

When the temperature sensed at step S92 is equal to reference temperature (i.e., temperature is maintained), the memory device may maintain the slope of the assistance voltage set to default at step S93.

When the temperature sensed at step S92 is higher than the reference temperature (i.e., temperature rises), the memory device may increase the slope of the assistance voltage set to default at step S94.

When the temperature sensed at step S92 is lower than the reference temperature (i.e., temperature drops), the memory device may decrease the slope of the assistance voltage set to default at step S95.

When any one of steps S93, S94, and S95 is completed, an erase operation may be performed on the selected memory block at step S96. The erase operation will be described in detail below with reference to FIG. 10.

Figure 10:
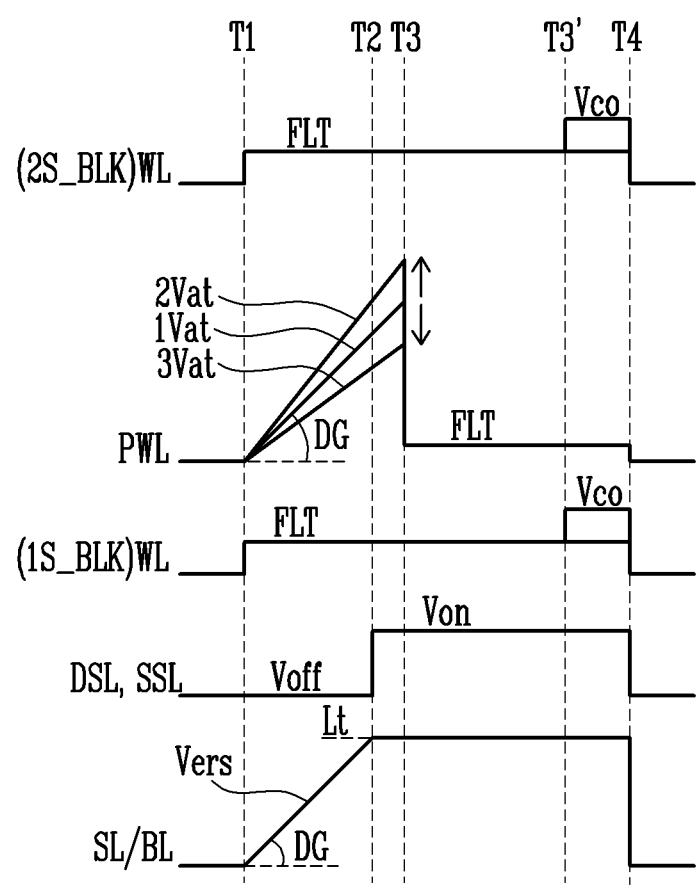
FIG. 10 is a timing diagram illustrating the erase operation according to the third embodiment of the present disclosure.

FIG. 10 is a timing diagram illustrating the erase operation according to the third embodiment of the present disclosure.

A source line SL, a bit line BL, a drain select line DSL, a source select line SSL, a word line WL, a pass word line PWL, a first sub-block 1S_BLK, and a second sub-block 2S_BLK, described with reference to FIG. 10, may correspond to lines or blocks illustrated in any one of FIGS. 4A to 4G.

Referring to FIG. 10, at a first time T1, an erase voltage Vers may be applied to the source line SL or the bit line BL, and an assistance voltage selected from among first to third assistance voltages 1Vat to 3Vat may be applied to the pass word line PWL. The erase voltage Vers may be a positive voltage higher than 0 V.

The first assistance voltage 1Vat may be an assistance voltage set to default, and may be a voltage equal to the erase voltage Vers. The second assistance voltage 2Vat may be a voltage higher than the erase voltage Vers, and the third assistance voltage 3Vat may be a positive voltage lower than the erase voltage Vers. The target levels of the first to third assistance voltages 1Vat to 3Vat may be different from each other, and the slopes DG thereof may also be different from each other. For example, assuming that the slope DG of the first assistance voltage 1Vat is a default slope, the second assistance voltage 2Vat may have a slope greater than the default slope, and the third assistance voltage 3Vat may have a slope less than the default slope.

At the first time T1, a turn-off voltage Voff may be applied to the drain select line DSL and the source select line SSL, and the word lines WL of the first and second sub-blocks 1S_BLK and 2S_BLK may float (FLT). The turn-off voltage Voff may be 0 V. Therefore, drain and source select transistors may be turned off. When the word lines WL are floating in the state in which the drain and source select transistors are turned off, coupling or boosting may occur in the word lines WL due to the voltages applied to the neighboring lines of the word lines WL, with result that the voltages of the word lines WL may increase. Even though the voltages of the word lines WL increase, since the voltages are increased by coupling or boosting, thus the voltages do not become high enough to influence electrons trapped into the memory cells.

During a period from the first to second times T1-T2, the levels of the erase voltage Vers applied to the source line SL or the bit line BL and the assistance voltage selected from among the first to third assistance voltages 1Vat to 3Vat applied to the pass word line PWL increase, and thus GIDL may occur in the drain or source select transistor that is turned-off. For example, when the erase voltage Vers is applied to the source line SL, GIDL may occur in the source select transistor. When the erase voltage Vers is applied to the bit line BL instead of the source line SL, GIDL may occur in the drain select transistor.

When the second time T2 at which the erase voltage Vers increases up to a target level Lt is reached, a turn-on voltage Von may be applied to the drain and source select lines DSL and SSL. The turn-on voltage Von may be set to a positive voltage that enables the drain or source select transistor to be turned on.

Even though the turn-on voltage Von is applied at the second time T2, a pumping operation for the assistance voltage selected from among the first to third assistance voltages 1Vat to 3Vat applied to the pass word line PWL may continue to be performed. For example, although the selected assistance voltage increases at the second time T2, the selected assistance voltage may further increase during a period from second to third times T2-T3 to maintain GIDL for a longer duration in a middle portion of the cell plug. That is, a main erase operation of erasing memory cells starts from the second time T2 at which the erase voltage Vers reaches the target level Lt, but a weak erase operation may also be performed on the memory cells due to electron holes even during the period from the first to second times T1-T2, which is the GIDL occurrence period. The weak erase operation refers to an operation in which memory cells are erased slower than the main erase operation.

When the third time T3 is reached, a voltage generator (e.g., 120 of FIG. 1) may decrease the voltage of the pass word line PWL, and may allow the pass word line PWL to float (FLT).

When the fourth time T4 at which the erase operation is terminated is reached, the potentials of the source line SL, the bit line BL, the drain select line DSL, the source select line SSL, the word lines WL, and the pass word line PWL may be discharged to 0 V.

Even in the third embodiment, at a 3'-rd time T3' that is the time before the fourth time T4 at which the word lines WL are discharged, an equalizing operation may be further performed.

Figure 11:
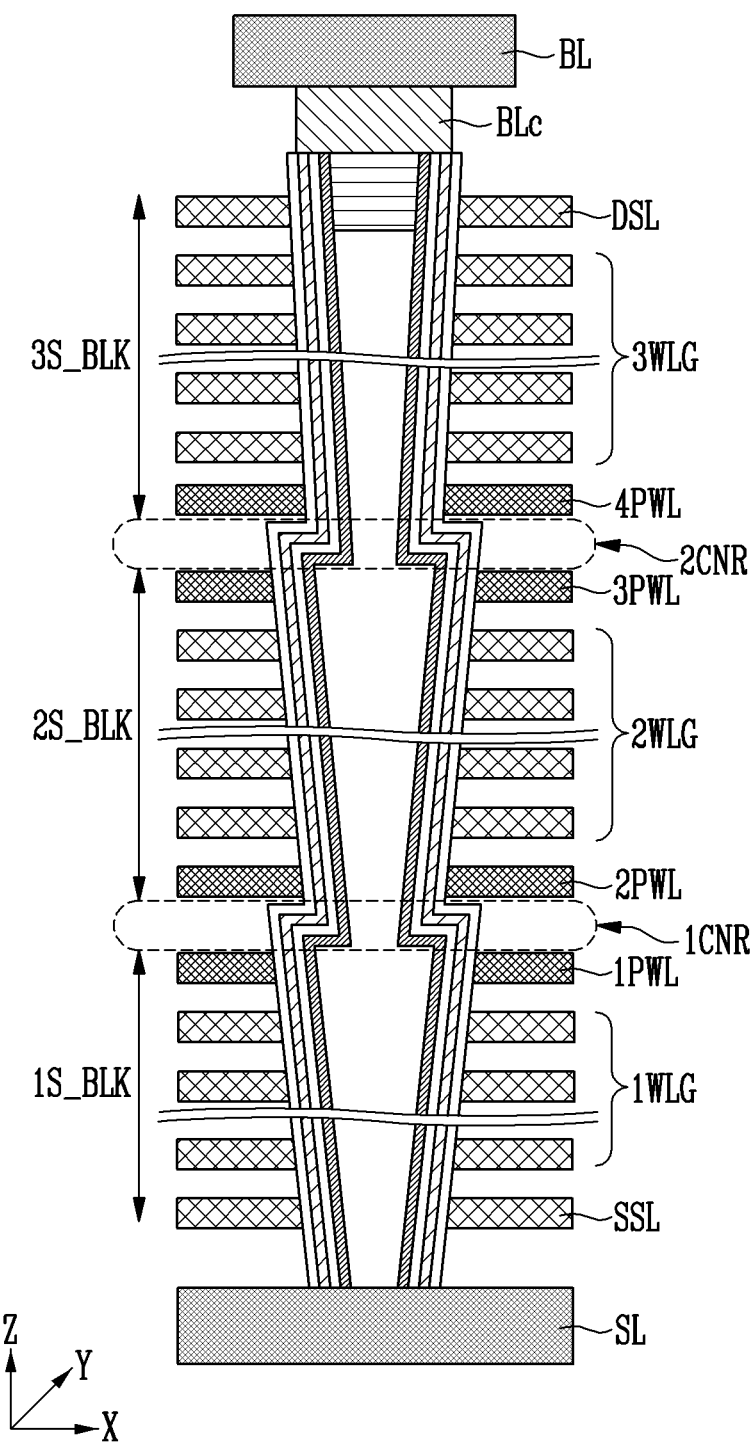
FIG. 11 is a diagram illustrating the structure of a cell plug according to an embodiment of the present disclosure.

FIG. 11 is a diagram illustrating the structure of a cell plug according to an embodiment of the present disclosure.

Referring to FIG. 11, a memory block may include at least three sub-blocks. In FIG. 11, a memory block including first to third sub-blocks 1S_BLK to 3S_BLK is illustrated by way of example.

The third sub-block 3S_BLK may be disposed on the second sub-block 2S_BLK. A first connection region 1CNR may be disposed between the first and second sub-blocks 1S_BLK and 2S_BLK, and a second connection region 2CNR may be disposed between the second and third sub-blocks 2S_BLK and 3S_BLK.

A gate line adjacent to the first connection region 1CNR, among gate lines included in the first sub-block 1S_BLK, may be designated as a first pass word line 1PWL. A gate line adjacent to the first connection region 1CNR, among gate lines included in the second sub-block 2S_BLK, may be designated as a second pass word line 2PWL. A gate line adjacent to the second connection region 2CNR, among the gate lines included in the second sub-block 2S_BLK, may be designated as a third pass word line 3PWL. A gate line adjacent to the second connection region 2CNR, among the gate lines included in the third sub-block 3S_BLK, may be designated as a fourth pass word line 4PWL. The number of first to fourth pass word lines 1PWL to 4PWL is not limited to that illustrated in FIG. 11.

The first sub-block 1S_BLK may include a source select line SSL, a first word line group 1WLG, and the first pass word line 1PWL. The second sub-block 2S_BLK may include a second word line group 2WLG, the second pass word line 2PWL, and the third pass word line 3PWL. The third sub-block 3S_BLK may include the fourth pass word line 4PWL, a third word line group 3WLG, and a drain select line DSL.

Figure 12:
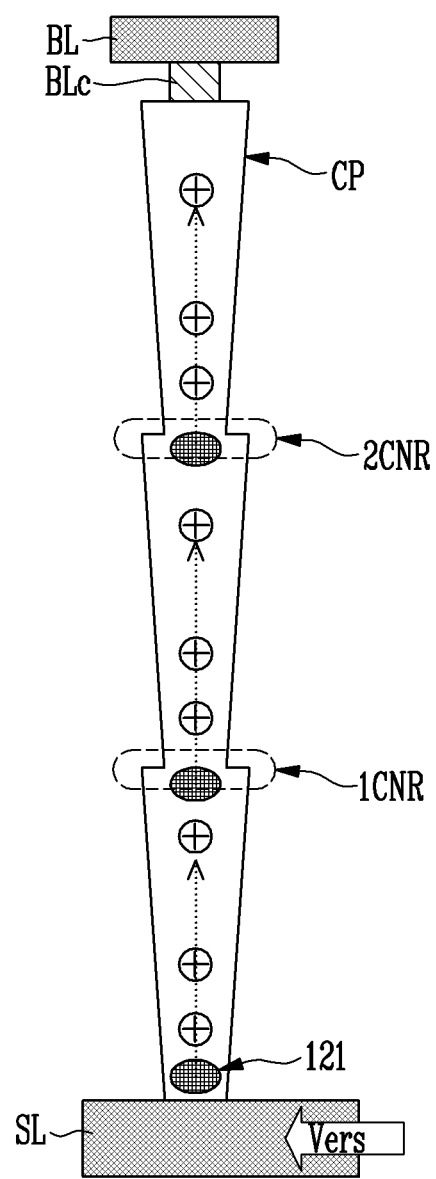
FIG. 12 is a diagram illustrating the principle of an erase operation according to a fourth embodiment of the present disclosure.

FIG. 12 is a diagram illustrating the principle of an erase operation according to a fourth embodiment of the present disclosure.

Referring to FIGS. 11 and 12, when an erase voltage Vers is applied to a source line SL, GIDL may occur in a region 121 adjacent to the source line SL among regions of a cell plug CP, and GIDL may occur in each of the first and second connection regions 1CNR and 2CNR. In the first connection region 1CNR, GIDL may occur due to the assistance voltage applied to the first and second pass word lines 1PWL and 2PWL. In the second connection region 2CNR, GIDL may occur due to the assistance voltage applied to the third and fourth pass word lines 3PWL and 4PWL.

When GIDL occurs at the end 121 of the cell plug CP and in both the first and second connection regions 1CNR and 2CNR, the time required by an electron hole (+) to move to the opposite end of the cell plug CP may be shortened. The erase operation according to the fourth embodiment may be performed as follows.

Figure 13:
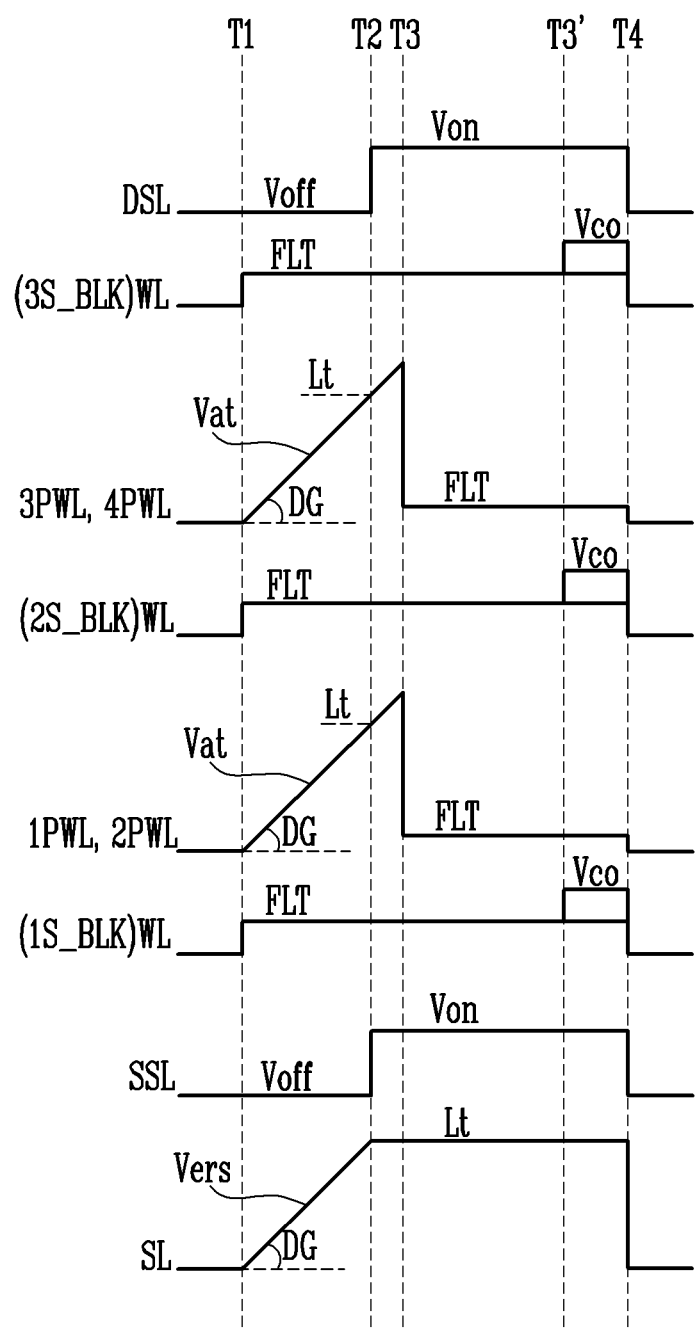
FIG. 13 is a timing diagram illustrating the erase operation according to the fourth embodiment of the present disclosure.

FIG. 13 is a timing diagram illustrating the erase operation according to the fourth embodiment of the present disclosure.

Referring to FIG. 13, at a first time T1, an erase voltage Vers may be applied to a source line SL, and an assistance voltage Vat may be applied to the first to fourth pass word lines 1PWL to 4PWL. The erase voltage Vers may be a positive voltage higher than 0 V. The assistance voltage Vat may be equal to the erase voltage Vers. A positive voltage or a ground voltage may be applied to the bit line BL.

At the first time T1, a turn-off voltage Voff may be applied to the drain select line DSL and the source select line SSL, and the word lines WL of the first to third sub-blocks 1S_BLK to 3S_BLK may float (FLT). The turn-off voltage Voff may be 0 V. Therefore, drain and source select transistors may be turned off. When the word lines WL are floating in the state in which the drain and source select transistors are turned off, coupling or boosting may occur in the word lines WL due to the voltages applied to the neighboring lines of the word lines WL, with result that the voltages of the word lines WL may increase. Even though the voltages of the word lines WL increase, since the voltages are increased by coupling or boosting, thus the voltages do not become high enough to influence electrons trapped into the memory cells.

During a period from the first to second times T1-T2, the levels of the erase voltage Vers applied to the source line SL and the assistance voltage Vat applied to the first to fourth pass word lines 1PWL to 4PWL increase, and thus GIDL may occur in the drain or source select transistor that is turned off. For example, when the erase voltage Vers is applied to the source line SL, GIDL may occur in the source select transistor.

When the second time T2 at which the erase voltage Vers increases up to a target level Lt is reached, a turn-on voltage Von may be applied to the drain and source select lines DSL and SSL. The turn-on voltage Von may be set to a positive voltage that enables the drain or source select transistor to be turned on.

Even though the turn-on voltage Von is applied at the second time T2, a pumping operation for the assistance voltage Vat applied to the first to fourth pass word lines 1PWL to 4PWL may continue to be performed. For example, at the second time T2, the assistance voltage Vat may further increase during a period from the second to third times T2-T3 to maintain GIDL for a longer duration in a middle portion of the cell plug. That is, a main erase operation of erasing memory cells starts from the second time T2 at which the erase voltage Vers reaches the target level Lt, but a weak erase operation may also be performed on the memory cells due to electron holes even during the period from the first to second times T1-T2, which is the GIDL occurrence period. The weak erase operation refers to an operation in which memory cells are erased slower than the main erase operation.

When the third time T3 is reached, the voltage generator (e.g., 120 of FIG. 1) may decrease the voltages of the first to fourth pass word lines 1PWL to 4PWL, and may allow the first to fourth pass word lines 1PWL to 4PWL to float (FLT).

When a fourth time T4 at which the erase operation is terminated is reached, the potentials of the source line SL, the bit line BL, the drain select line DSL, the source select line SSL, the word lines WL, and the first to fourth pass word lines 1PWL to 4PWL may be discharged to 0 V.

Even in the fourth embodiment, at a 3'-rd time T3' that is the time before the fourth time T4 at which the word lines WL are discharged, an equalizing operation may be further performed.

Figure 14:
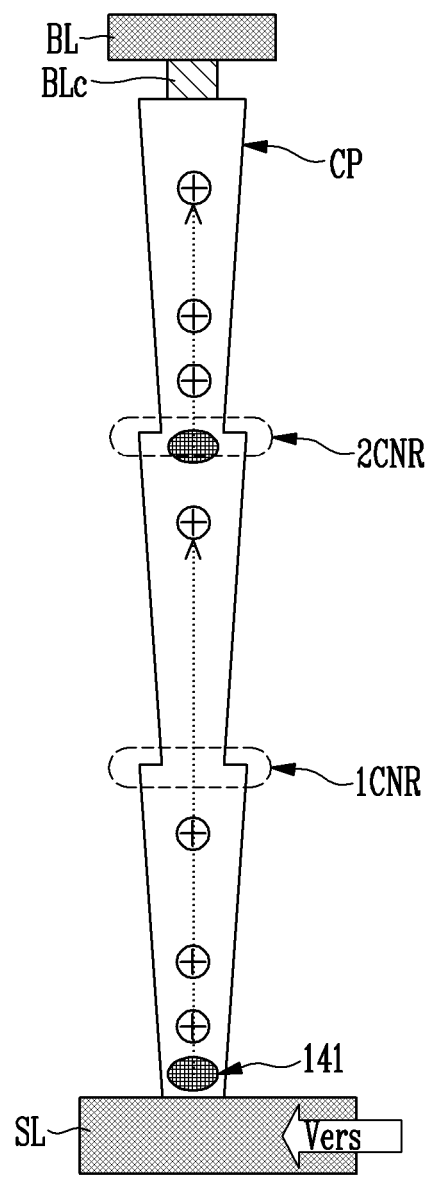
FIG. 14 is a diagram illustrating the principle of an erase operation according to a fifth embodiment of the present disclosure.

FIG. 14 is a diagram illustrating the principle of an erase operation according to a fifth embodiment of the present disclosure.

Referring to FIGS. 11 and 14, additional GIDL may occur in a connection region relatively far away from a portion to which the erase voltage Vers is applied, and additional GIDL might not occur in a connection region relatively close to the portion. For example, when the erase voltage Vers is applied to the source line SL, main GIDL may occur in a region 141 adjacent to the source line SL among regions of the cell plug CP. Of the first and second connection regions 1CNR and 2CNR, the second connection region 2CNR relatively far away from the region 141 in which main GIDL occurs may cause additional GIDL, and the first connection region 1CNR relatively close thereto might not cause additional GIDL.

The erase operation according to the fifth embodiment may be performed as follows.

Figure 15:
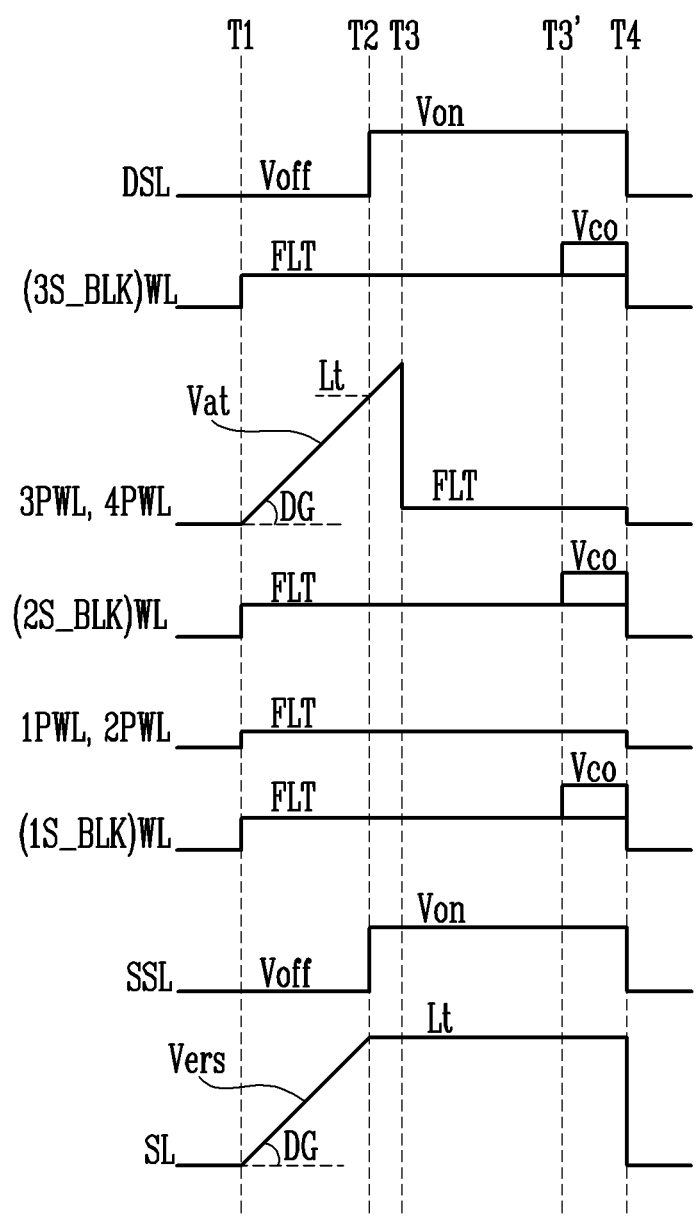
FIG. 15 is a timing diagram illustrating the erase operation according to the fifth embodiment of the present disclosure.

FIG. 15 is a timing diagram illustrating the erase operation according to the fifth embodiment of the present disclosure.

Referring to FIG. 15, at a first time T1, the erase voltage Vers may be applied to the source line SL, and the assistance voltage Vat may be applied to the third and fourth pass word lines 3PWL and 4PWL. The erase voltage Vers may be a positive voltage higher than 0 V. The assistance voltage Vat may be equal to the erase voltage Vers. A positive voltage or a ground voltage may be applied to the bit line BL.

At the first time T1, a turn-off voltage Voff may be applied to a drain select line DSL and a source select line SSL, and the word lines WL of the first to third sub-blocks 1S_BLK to 3S_BLK and first and second pass word lines 1PWL and 2PWL may float (FLT). The turn-off voltage Voff may be 0 V. Therefore, drain and source select transistors may be turned off. When the word lines WL and the first and second pass word lines 1PWL and 2PWL are floating in the state in which the drain and source select transistors are turned off, coupling or boosting may occur in the word lines WL and the first and second pass word lines 1PWL and 2PWL due to the voltages applied to the neighboring lines of the word lines WL and the first and second pass word lines 1PWL and 2PWL, with the result that the voltages of the word lines WL and the first and second pass word lines 1PWL and 2PWL may increase. Even though the voltages of the word lines WL increase, since the voltages are increased by coupling or boosting, thus the voltages do not become high enough to influence electrons trapped into the memory cells.

During a period from the first to second times T1-T2, the levels of the erase voltage Vers applied to the source line SL and the assistance voltage Vat applied to the third and fourth pass word lines 3PWL and 4PWL increase, and thus main GIDL may occur in the drain or source select transistor that is turned off. For example, when the erase voltage Vers is applied to the source line SL, main GIDL may occur in the source select transistor.

When the second time T2 at which the erase voltage Vers increases up to a target level Lt is reached, a turn-on voltage Von may be applied to the drain and source select lines DSL and SSL. The turn-on voltage Von may be set to a positive voltage that enables the drain or source select transistor to be turned on.

Even though the turn-on voltage Von is applied at the second time T2, a pumping operation for the assistance voltage Vat applied to the third and fourth pass word lines 3PWL and 4PWL may continue to be performed. For example, at the second time T2, the assistance voltage Vat may further increase during a period from the second to third times T2-T3 to maintain GIDL for a longer duration in a portion of the cell plug. That is, a main erase operation of erasing memory cells starts from the second time T2 at which the erase voltage Vers reaches the target level Lt, but a weak erase operation may also be performed on the memory cells due to electron holes even during the period from the first to second times T1-T2, which is the GIDL occurrence period. The weak erase operation refers to an operation in which memory cells are erased slower than the main erase operation.

When the third time T3 is reached, the voltage generator (e.g., 120 of FIG. 1) may decrease the voltages of the third and fourth pass word lines 3PWL and 4PWL, and may allow the third and fourth pass word lines 3PWL and 4PWL to float (FLT).

When a fourth time T4 at which the erase operation is terminated is reached, the potentials of the source line SL, the bit line BL, the drain select line DSL, the source select line SSL, the word lines WL, and the first to fourth pass word lines 1PWL to 4PWL may be discharged to 0 V.

Even in the fifth embodiment, at a 3'-rd time T3' that is the time before the fourth time T4 at which the word lines WL are discharged, an equalizing operation may be further performed.

Figure 16:
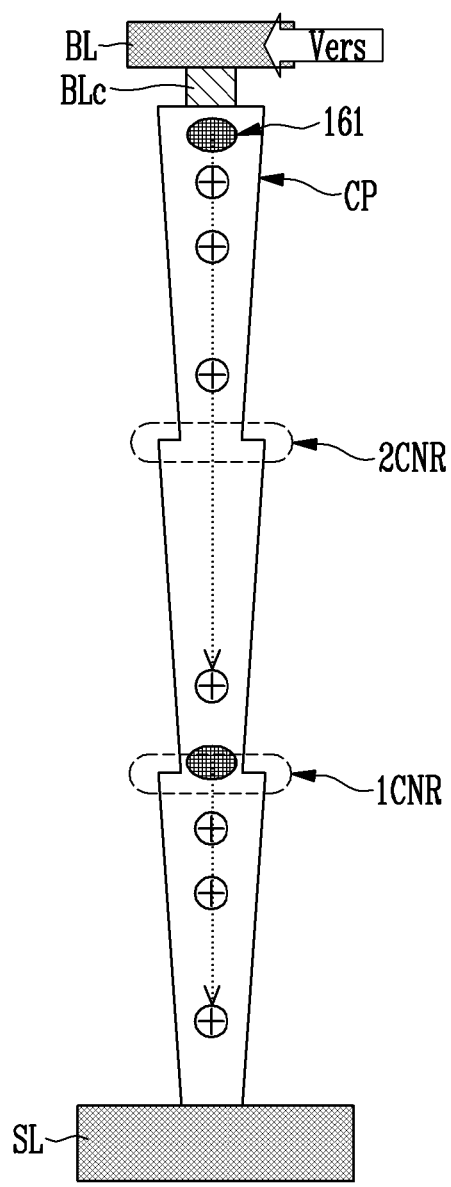
FIG. 16 is a diagram illustrating the principle of an erase operation according to a sixth embodiment of the present disclosure.

FIG. 16 is a diagram illustrating the principle of an erase operation according to a sixth embodiment of the present disclosure.

Referring to FIGS. 11 and 16, an erase voltage Vers may be applied to a bit line BL. In this case, main GIDL may occur in a region 161 adjacent to the bit line BL among regions of the cell plug CP. Of the first and second connection regions 1CNR and 2CNR, the first connection region 1CNR relatively far away from the region 161 in which main GIDL occurs may cause additional GIDL, and the second connection region 2CNR relatively close thereto might not cause additional GIDL.

The erase operation according to the sixth embodiment may be performed as follows.

Figure 17:
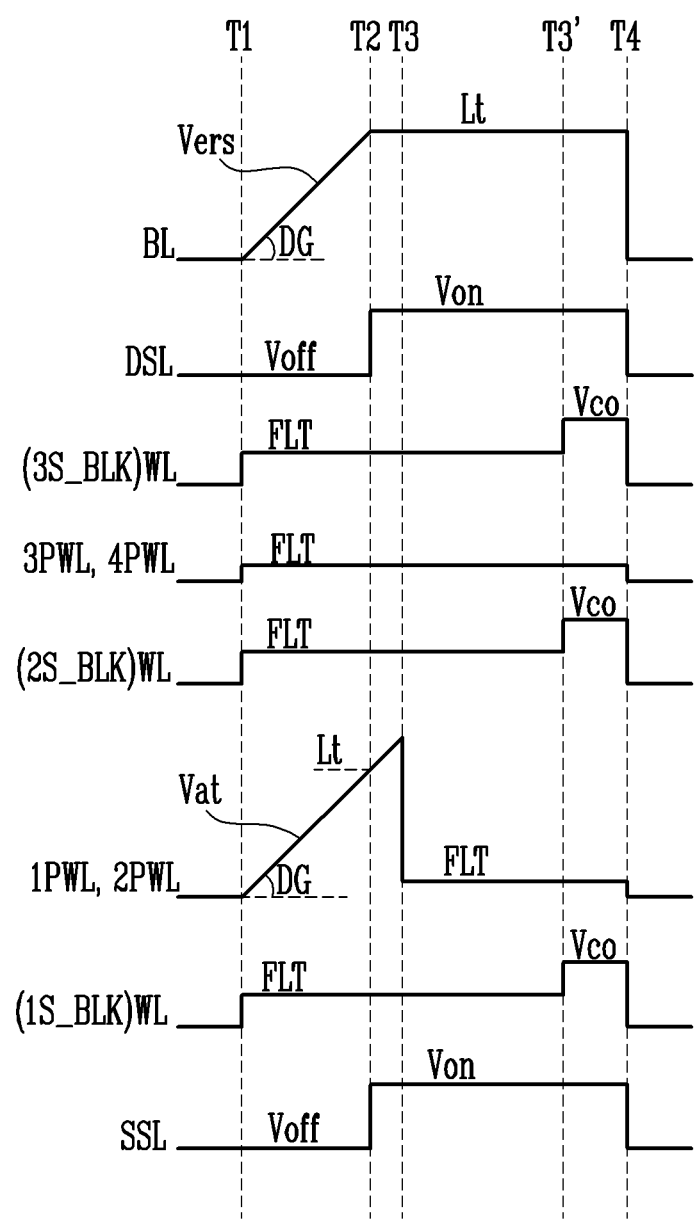
FIG. 17 is a timing diagram illustrating the erase operation according to the sixth embodiment of the present disclosure.

FIG. 17 is a timing diagram illustrating the erase operation according to the sixth embodiment of the present disclosure.

Referring to FIG. 17, at a first time T1, an erase voltage Vers may be applied to a bit line BL, and an assistance voltage Vat may be applied to first and second pass word lines 1PWL and 2PWL. The erase voltage Vers may be a positive voltage higher than 0 V. The assistance voltage Vat may be equal to the erase voltage Vers. A positive voltage or a ground voltage may be applied to the source line SL.

At the first time T1, a turn-off voltage Voff may be applied to a drain select line DSL and a source select line SSL, and the word lines WL of the first to third sub-blocks 1S_BLK to 3S_BLK and third and fourth pass word lines 3PWL and 4PWL may float (FLT). The turn-off voltage Voff may be 0 V. Therefore, drain and source select transistors may be turned off. When the word lines WL and the third and fourth pass word lines 3PWL and 4PWL are floating in the state in which the drain and source select transistors are turned off, coupling or boosting may occur in the word lines WL and the third and fourth pass word lines 3PWL and 4PWL due to the voltages applied to the neighboring lines of the word lines WL and the third and fourth pass word lines 3PWL and 4PWL, with the result that the voltages of the word lines WL and the third and fourth pass word lines 3PWL and 4PWL may increase. Even though the voltages of the word lines WL increase, since the voltages are increased by coupling or boosting, thus the voltages do not become high enough to influence electrons trapped into the memory cells.

During a period from the first to second times T1-T2, the levels of the erase voltage Vers applied to the source line SL and the assistance voltage Vat applied to the first and second pass word lines 1PWL and 2PWL increase, and thus main GIDL may occur in the drain or source select transistor that is turned off. For example, when the erase voltage Vers is applied to the bit line BL, main GIDL may be generated in the drain select transistor.

When the second time T2 at which the erase voltage Vers increases up to a target level Lt is reached, a turn-on voltage Von may be applied to the drain and source select lines DSL and SSL. The turn-on voltage Von may be set to a positive voltage that enables the drain or source select transistor to be turned on.

Even though the turn-on voltage Von is applied at the second time T2, a pumping operation for the assistance voltage Vat applied to the first and second pass word lines 1PWL and 2PWL may continue to be performed. For example, at the second time T2, the assistance voltage Vat may further increase during a period from the second to third times T2-T3 to maintain GIDL for a longer duration in a portion of the cell plug. That is, a main erase operation of erasing memory cells starts from the second time T2 at which the erase voltage Vers reaches the target level Lt, but a weak erase operation may also be performed on the memory cells due to electron holes even during the period from the first to second times T1-T2, which is the GIDL occurrence period. The weak erase operation refers to an operation in which memory cells are erased slower than the main erase operation.

When the third time T3 is reached, the voltage generator (e.g., 120 of FIG. 1) may decrease the voltages of the first and second pass word lines 1PWL and 2PWL, and may allow the first and second pass word lines 1PWL and 2PWL to float (FLT).

When a fourth time T4 at which the erase operation is terminated is reached, the potentials of the source line SL, the bit line BL, the drain select line DSL, the source select line SSL, the word lines WL, and the first to fourth pass word lines 1PWL to 4PWL may be discharged to 0 V.

Even in the sixth embodiment, at a 3'-rd time T3' that is the time before the fourth time T4 at which the word lines WL are discharged, an equalizing operation may be further performed.

Figure 18:
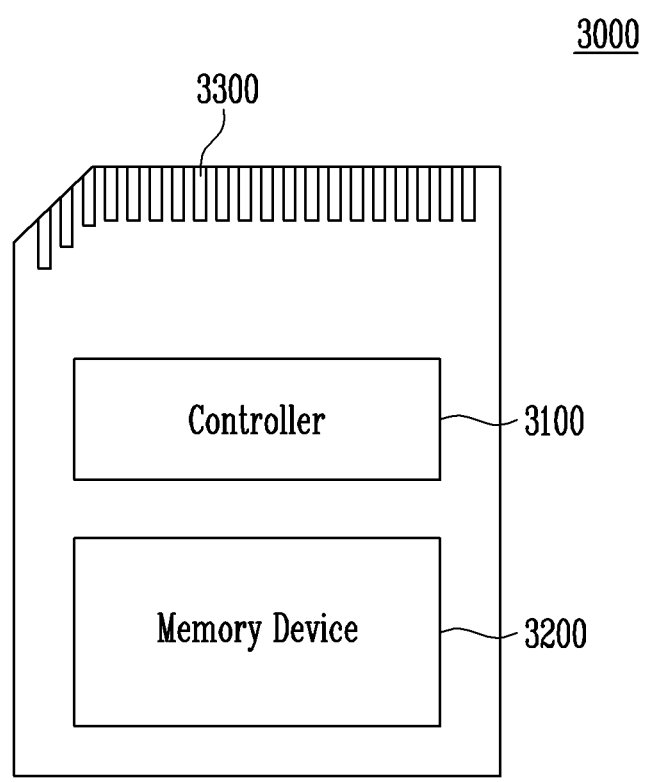
FIG. 18 is a diagram illustrating a memory card system to which a memory device according to the present disclosure is applied.

FIG. 18 is a diagram illustrating a memory card system to which a memory device according to the present disclosure is applied.

Referring to FIG. 18, a memory card system 3000 includes a controller 3100, a memory device 3200, and a connector 3300.

The controller 3100 is coupled to the memory device 3200. The controller 3100 may access the memory device 3200. For example, the controller 3100 may control a program, a read, or an erase operation of the memory device 3200 or control background operations of the memory device 3200. The controller 3100 may provide an interface between the memory device 3200 and a host. The controller 3100 may run firmware for controlling the memory device 3200. In an embodiment, the controller 3100 may include components, such as a RAM, a processor, a host interface, a memory interface, and an error correction circuit.

The controller 3100 may communicate with an external device through the connector 3300. The controller 3100 may communicate with an external device (e.g., a host) based on a specific communication standard. In an embodiment, the controller 3100 may communicate with the external device through at least one of various communication standards such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe). In an embodiment, the connector 3300 may be defined by at least one of the above-described various communication standards.

The memory device 3200 may include a plurality of memory cells and may be configured in the same manner as the memory device 100 illustrated in FIG. 1.

The controller 3100 and the memory device 3200 may be integrated into a single semiconductor device to form a memory card. For example, the controller 3100 and the memory device 3200 may be integrated into a single semiconductor device and may then form a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), universal flash storage (UFS), or the like.

Figure 19:
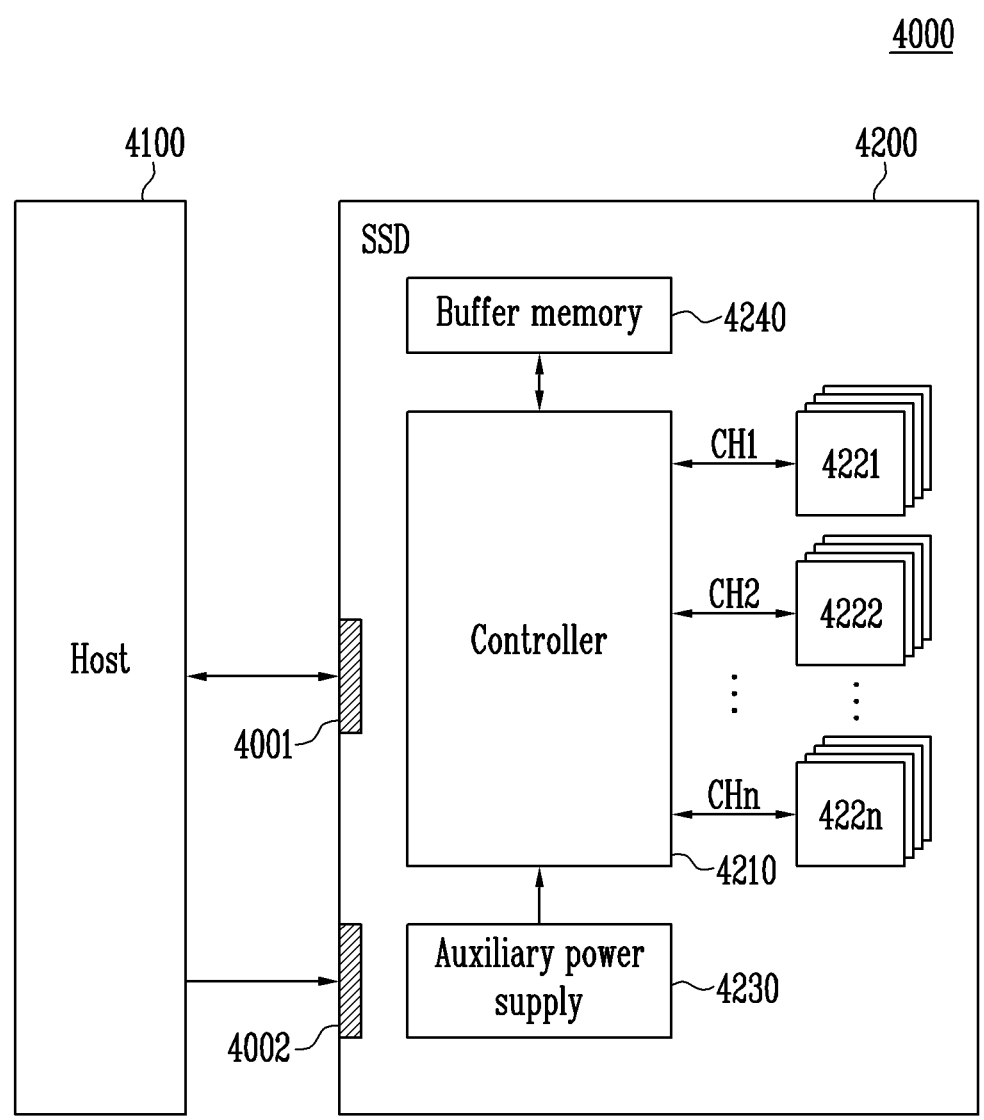
FIG. 19 is a diagram illustrating a solid-state drive (SSD) system to which a memory device according to the present disclosure is applied.

FIG. 19 is a diagram illustrating a solid-state drive (SSD) system to which a memory device according to the present disclosure is applied.

Referring to FIG. 19, an SSD system 4000 includes a host 4100 and an SSD 4200. The SSD 4200 may exchange a signal with the host 4100 through a signal connector 4001, and may receive power through a power connector 4002. The SSD 4200 may include a controller 4210, a plurality of memory devices 4221 to 422n, an auxiliary power supply 4230, and buffer memory 4240.

The controller 4210 may control the plurality of memory devices 4221 to 422n in response to a signal received from the host 4100. In an embodiment, the signal may include signals based on the interfaces of the host 4100 and the SSD 4200. For example, the signal may be a signal defined by at least one of interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe).

Each of the plurality of memory devices 4221 to 422n may include a plurality of memory cells which store data. Each of the plurality of memory devices 4221 to 422n may be configured in the same manner as the memory device 100 illustrated in FIG. 1. The plurality of memory devices 4221 to 422n may communicate with the controller 4210 through channels CH1 to CHn.

The auxiliary power supply 4230 may be coupled to the host 4100 through the power connector 4002. The auxiliary power supply 4230 may be supplied with a supply voltage from the host 4100, and may be charged. The auxiliary power supply 4230 may provide the supply voltage of the SSD 4200 when the supply of power from the host 4100 is not smoothly performed. In an embodiment, the auxiliary power supply 4230 may be located inside the SSD 4200 or located outside the SSD 4200. For example, the auxiliary power supply 4230 may be located on a main board, and may also provide auxiliary power to the SSD 4200.

The buffer memory 4240 functions as buffer memory of the SSD 4200. For example, the buffer memory 4240 may temporarily store data received from the host 4100 or data received from the plurality of memory devices 4221 to 422n or may temporarily store metadata (e.g., mapping tables) of the memory devices 4221 to 422n. The buffer memory 4240 may include volatile memory, such as DRAM, SDRAM, DDR SDRAM, and LPDDR SDRAM, or nonvolatile memory, such as FRAM, ReRAM, STT-MRAM, and PRAM.

The teachings of the present disclosure may shorten the time required for an erase operation of a memory device in some embodiments.

What is claimed is:

1. A memory device, comprising:
    a memory block including a cell plug extending between a first line and a second line, wherein a first select line, a first word line group, a first pass word line, a second word line group, and a second select line are arranged along the cell plug between the first line and the second line; and
    a peripheral circuit configured to apply an erase voltage to the first line or the second line, apply an assistance voltage to the first pass word line when the erase voltage is applied, and decrease a potential of the first pass word line while the erase voltage is maintained at a target level.

2. The memory device according to claim 1, wherein the peripheral circuit is configured to, after the erase voltage applied to the first line or the second line has reached the target level, further apply the assistance voltage to the first pass word line for a time interval.

3. The memory device according to claim 2, wherein the assistance voltage increases for the time interval.

4. The memory device according to claim 1, wherein the peripheral circuit comprises:
    a voltage generator configured to generate the erase voltage and the assistance voltage.

5. The memory device according to claim 4, wherein the voltage generator is configured to generate the assistance voltage equal to the erase voltage.

6. The memory device according to claim 1, wherein each of the erase voltage and the assistance voltage is a positive voltage higher than 0 V.

7. The memory device according to claim 1, wherein the peripheral circuit is configured to apply a turn-off voltage to the first and second select lines while the erase voltage and the assistance voltage are increasing.

8. The memory device according to claim 7, wherein the peripheral circuit is configured to apply a turn-on voltage, higher than the turn-off voltage, to the first and second select lines when the erase voltage reaches the target level.

9. The memory device according to claim 1, wherein the peripheral circuit is configured to allow word lines included in the first and second word line groups to float.

10. The memory device according to claim 1, wherein the memory block further comprises:
a second pass word line and a third word line group disposed between the second word line group and the second select line.

11. The memory device according to claim 10, wherein the peripheral circuit is configured to, when applying the erase voltage to the first line, apply the assistance voltage to the first and second pass word lines.

12. The memory device according to claim 10, wherein the peripheral circuit is configured to, when applying the erase voltage to the second line,
apply the assistance voltage to the first pass word line, and allow the second pass word line to float.

13. The memory device according to claim 1, wherein the first pass word line is located within one word line of a connection region in which the cell plug abruptly changes its width.

14. The memory device according to claim 1, wherein the cell plug comprises:
a first select transistor coupled to the first select line;
first memory cells coupled to word lines included in the first word line group;
a first pass cell coupled to the first pass word line;
second memory cells coupled to word lines included in the second word line group; and
a second select transistor coupled to the second select line.

15. The memory device according to claim 1, wherein the peripheral circuit further comprises:
a sensor configured to sense a temperature of the memory device.

16. The memory device according to claim 15, wherein the peripheral circuit is configured to adjust a level of the assistance voltage depending on the temperature sensed by the sensor.

17. The memory device according to claim 15, wherein the peripheral circuit is configured to adjust a level of the assistance voltage in proportion to the temperature sensed by the sensor.

18. A memory device, comprising:
first to third sub-blocks disposed between a first line and a second line;
a first connection region disposed between the first and second sub-blocks;
a second connection region disposed between the second and third sub-blocks;
a first pass word line adjacent to the first connection region;
a second pass word line adjacent to the second connection region; and
a peripheral circuit configured to apply an assistance voltage to the first pass word line or the second pass word line while an erase voltage is applied to the first line or the second line, and configured to decrease a potential of the first pass word line or the second pass word line to which the assistance voltage is applied while the erase voltage is maintained at a target level.

19. The memory device according to claim 18, wherein the peripheral circuit is configured to apply the assistance voltage to the first pass word line or the second pass word line at a same time that the erase voltage is applied to the first line or the second line.

20. The memory device according to claim 18, wherein the peripheral circuit is configured to apply the assistance voltage to a pass word line located farther away from a region to which the erase voltage is applied among the first pass word line and the second pass word line.

21. The memory device according to claim 18, wherein the peripheral circuit is configured to apply the assistance voltage to the first pass word line and the second pass word line at a same time that the erase voltage is applied to the first line or the second line.

22. The memory device according to claim 18, wherein the peripheral circuit is configured to allow the first and second pass word lines, the potentials of which are decreased, to float while the erase voltage is maintained at the target level.

* * * * *